United States Patent
Yang et al.

(10) Patent No.: US 9,740,325 B2
(45) Date of Patent: Aug. 22, 2017

(54) TOUCH DISPLAY CIRCUIT AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 1 day.

(21) Appl. No.: 14/768,978

(22) PCT Filed: Oct. 27, 2014

(86) PCT No.: PCT/CN2014/089547
§ 371 (c)(1),
(2) Date: Aug. 19, 2015

(87) PCT Pub. No.: WO2016/015392
PCT Pub. Date: Feb. 4, 2016

(65) Prior Publication Data
US 2016/0274719 A1     Sep. 22, 2016

(30) Foreign Application Priority Data
Jul. 30, 2014    (CN) .......................... 2014 1 0371059

(51) Int. Cl.
*G06F 3/041*    (2006.01)
*G06F 3/042*    (2006.01)
(Continued)

(52) U.S. Cl.
CPC ............ *G06F 3/0416* (2013.01); *G06F 3/042* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

2011/0001711 A1    1/2011  Choi et al.
2014/0168127 A1    6/2014  Yang

FOREIGN PATENT DOCUMENTS

CN    101943974 A    1/2011
CN    103135846 A    6/2013
(Continued)

OTHER PUBLICATIONS

First Chinese Office Action Appln. No. 201410371059.1; Dated Jan. 22, 2016.
(Continued)

*Primary Examiner* — Kenneth B Lee, Jr.
(74) *Attorney, Agent, or Firm* — Ladas & Parry LLP

(57) ABSTRACT

A touch display circuit and a display device are provided. The touch display circuit comprises a photosensitive touch unit (11), a driving unit (12), a threshold compensating unit (13) and a display unit (14). The photosensitive touch unit (11) generates a second detection signal under a control of a second scanning signal terminal (S2) when a first scanning signal terminal (S1) inputs a first detection signal. The threshold compensating unit (13) outputs a control voltage to a control terminal (d1) of the driving unit (12), outputs an operating voltage to an input terminal (d2) of the driving unit (12), and compensates a threshold voltage of the driving unit (12) by using the control voltage under control of a third (Continued)

scanning line signal terminal (S3), a fourth scanning line signal terminal (S4) and a data line (Data). The driving unit (12) outputs a driving current to the display unit (14) via an output terminal (d3) under control of the control voltage and the operating voltage. The display unit (14) is driven to emit light by the driving current under control of the fifth scanning signal terminal (S5). By using the touch display circuit, photosensitive in cell touch technology can be integrated into an AMOLED display.

20 Claims, 11 Drawing Sheets

(51) Int. Cl.
    *G06F 3/044*     (2006.01)
    *G09G 3/3258*     (2016.01)
    *G09G 3/3266*     (2016.01)
    *G09G 3/3291*     (2016.01)

(52) U.S. Cl.
    CPC ......... *G09G 3/3258* (2013.01); *G09G 3/3266* (2013.01); *G09G 3/3291* (2013.01); *G06F 2203/04103* (2013.01); *G09G 2300/0809* (2013.01); *G09G 2300/0819* (2013.01); *G09G 2300/0852* (2013.01); *G09G 2310/0202* (2013.01); *G09G 2310/0262* (2013.01); *G09G 2310/0278* (2013.01); *G09G 2320/045* (2013.01)

(56) References Cited

FOREIGN PATENT DOCUMENTS

| | | |
|---|---|---|
| CN | 103236238 A | 8/2013 |
| CN | 203232681 U | 10/2013 |
| CN | 103413521 A | 11/2013 |
| CN | 103456267 A | 12/2013 |
| CN | 203503280 U | 3/2014 |
| CN | 103971639 A | 8/2014 |
| CN | 103996377 A | 8/2014 |
| CN | 104078006 A | 10/2014 |
| CN | 104102382 A | 10/2014 |
| EP | 2887344 A1 | 6/2015 |

OTHER PUBLICATIONS

International Search Report with English translation and Written Opinion both dated May 8, 2015; PCT/CN2014/089547.

TOUCH DISPLAY CIRCUIT AND DISPLAY DEVICE

TECHNICAL FIELD

Embodiments of the present application relate to a field of display fabrication, and more particularly, to a touch display circuit and a display device.

BACKGROUND

An Active Matrix Organic Light-Emitting Diode (AMOLED) is one of hot spots of research in a field of flat panel displays at present. As compared with a liquid crystal display, an Organic Light-Emitting Diode (OLED) has advantages such as low power consumption, low production cost, self-illumination, a wide viewing angle and a fast response speed. Currently, the OLED has begun to replace a traditional Liquid Crystal Display (LCD) in display fields such as a mobile phone, a Personal Digital Assistant (PDA), and a digital camera. Pixel driving circuit design is core technology content of an OLED display, which is of great research significance. Different from a Thin-Film Transistor (TFT)-LCD which controls luminance by using a stable voltage, the OLED is current-driven, and needs a stable current to control light emission.

At present, some photosensitive in cell touch technologies have been successfully applied to the LCD. First-tier manufacturers in the industry have successfully implemented mass production. One of the advantages of photosensitive touch control is that it also has touch sensitivity and function same as those of capacitive touch control, the other advantage thereof is that the photosensitive touch is not limited in a screen size, and it has a share in an aspect of large-sized touch control. In addition, in the photosensitive touch control, not only the touch control can be implemented by finger directly, but also direct remote touch control can be implemented by using a laser pointer. Application of the photosensitive in cell touch technology to the AMOLED display becomes a development direction of a new generation of displays.

SUMMARY

Embodiments of the present application provide a touch display circuit and a display device, which are capable of efficiently integrating the photosensitive in cell touch technology into an AMOLED display.

To achieve the above object, the embodiments of the present application use technical solutions as follows.

In one aspect, an embodiment of the present application provides a touch display circuit, comprising a photosensitive touch unit, a driving unit, a threshold compensating unit and a display unit. The photosensitive touch unit is connected with a first scanning signal terminal, a second scanning signal terminal, a signal detection line and a data line, and is used for, when the first scanning signal terminal inputs a first detection signal, generating a second detection signal according to light intensity of a touch position and a data signal of the data line under control of the second scanning signal terminal, and outputting the second detection signal through the signal detection line. The threshold compensating unit is connected with a third scanning line signal terminal, a fourth scanning line signal terminal, the data line and a control terminal and an input terminal of the driving unit, and is used for outputting a control voltage to the control terminal of the driving unit, outputting an operating voltage to the input terminal of the driving unit, and compensating a threshold voltage of the driving unit in the control voltage under control of the third scanning line signal terminal, the fourth scanning line signal terminal and the data line. The control terminal and the input terminal of the driving unit are connected with the threshold compensating unit, and are used for outputting a driving current to the display unit via an output terminal under control of the control voltage and the operating voltage. The display unit is connected with a fifth scanning signal terminal and the output terminal of the driving unit, and is used for driving to emit light by the driving current under control of the fifth scanning signal terminal.

Optionally, the photosensitive touch unit includes: a first transistor, a second transistor, a third transistor and a first capacitor. A gate of the first transistor is connected with the first scanning signal terminal, and a first electrode of the first transistor is connected with the data line. A gate of the second transistor is connected with a first electrode of the second transistor, and the first electrode of the second transistor is connected with a second electrode of the first transistor. A first electrode of the first capacitor is connected with the gate of the second transistor, and a second electrode of the first capacitor is connected with a second electrode of the second transistor. A first electrode of the third transistor is connected with the second electrode of the second transistor, a gate of the third transistor is connected with the second scanning signal terminal, and a second electrode of the third transistor is connected with the signal detection line. The second transistor is a photosensitive transistor.

Optionally, the threshold compensating unit includes: a fourth transistor, a fifth transistor, a sixth transistor, a seventh transistor and a second capacitor. A gate of the fourth transistor is connected with a fourth scanning signal terminal, a first electrode of the fourth transistor is connected with a first level terminal, and a second electrode of the fourth transistor is connected with a second electrode of the second capacitor. A gate of the fifth transistor is connected with the fourth scanning signal terminal, a first electrode of the fifth transistor is connected with the first level terminal, and a second electrode of the fifth transistor is connected with the input terminal of the driving unit. A gate of the sixth transistor is connected with the third scanning signal terminal, a first electrode of the sixth transistor is connected with a first electrode of the second capacitor, and a second electrode of the sixth transistor is connected with the input terminal of the driving unit. A gate of the seventh transistor is connected with the third scanning signal terminal, a first electrode of the seventh transistor is connected with the data line, and a second electrode of the seventh transistor is connected with the second electrode of the second capacitor. The first electrode of the second capacitor is connected with the control terminal of the driving unit.

Optionally, the display unit includes: a ninth transistor and a light-emitting diode connected in series. A gate of the ninth transistor is connected with the fifth scanning signal terminal, a first electrode of the ninth transistor is connected with the output terminal of the driving unit, a second electrode of the ninth transistor is connected with a first electrode of the light-emitting diode, a second electrode of the light-emitting diode is connected with a second level terminal. Or, the display unit includes: a ninth transistor and a light-emitting diode connected in parallel. A gate of the ninth transistor is connected with the fifth scanning signal terminal, a first electrode of the ninth transistor is connected with the output terminal of the driving unit, and a second electrode of the ninth transistor is connected with the second level terminal.

A first electrode of the light-emitting diode is connected with the output terminal of the driving unit, and a second electrode of the light-emitting diode is connected with the second level terminal.

Optionally, when the ninth transistor and the light-emitting diode are connected in parallel, the first scanning signal terminal, the third scanning signal terminal and the fifth scanning signal terminal are connected with a first scanning line; and the second scanning signal terminal and the fourth scanning signal terminal are connected with a second scanning line.

Optionally, when the ninth transistor and the light-emitting diode are connected in series, the first scanning signal terminal and the third scanning signal terminal are connected with a first scanning line; the second scanning signal terminal and the fourth scanning signal terminal are connected with a second scanning line; and the fifth scanning signal terminal is connected with a third scanning line.

Optionally, the threshold compensating unit is further connected with the output terminal of the driving unit and a sixth scanning signal terminal, and is used for outputting a control voltage to the control terminal of the driving unit, outputting an operating voltage to the input terminal of the driving unit, and compensating a threshold voltage of the driving unit in the control voltage under control of the third scanning line signal terminal, the fourth scanning line signal terminal, the sixth scanning signal terminal and the data line. The threshold compensating unit includes: a fourth transistor, a fifth transistor, a sixth transistor, a seventh transistor and a second capacitor. A gate of the fourth transistor is connected with the sixth scanning signal terminal, a first electrode of the fourth transistor is connected with a first level terminal, and a second electrode of the fourth transistor is connected with the input terminal of the driving unit. A first electrode of the second capacitor is connected with the first level terminal, and a second electrode of the second capacitor is connected with the control terminal of the driving unit. A gate of the fifth transistor is connected with the fourth scanning signal terminal, a first electrode of the fifth transistor is connected with the second electrode of the second capacitor, and a second electrode of the fifth transistor is connected with the input terminal of the driving unit. A gate of the sixth transistor is connected with the third scanning signal terminal, a first electrode of the sixth transistor is connected with a third level terminal, and a second electrode of the sixth transistor is connected with the second electrode of the second capacitor. A gate of the seventh transistor is connected with the fourth scanning signal terminal, a first electrode of the seventh transistor is connected with the data line, and a second electrode of the seventh transistor is connected with the output terminal of the driving unit.

Optionally, the first scanning signal terminal and the third scanning signal terminal are connected with a first scanning line; the second scanning signal terminal and the fourth scanning signal terminal are connected with a second scanning line; and the fifth scanning signal terminal and the sixth scanning signal terminal are connected with a third scanning line.

Optionally, the photosensitive touch unit is further connected with a sixth scanning signal terminal; and the photosensitive touch unit includes a first transistor, a second transistor, a third transistor, a fourth transistor and a first capacitor. A gate of the first transistor is connected with the first scanning signal terminal, and a first electrode of the first transistor is connected with the data line. A gate of the second transistor is connected with the first electrode of the second transistor, and the first electrode of the second transistor is connected with the second electrode of the first transistor. A first electrode of the first capacitor is connected with the gate of the second transistor, and a second electrode of the first capacitor is connected with a second electrode of the second transistor. A first electrode of the third transistor is connected with the second electrode of the second transistor, a gate of the third transistor is connected with the second scanning signal terminal, and a second electrode of the third transistor is connected with the signal detection line. A gate of the fourth transistor is connected with the sixth scanning signal terminal, a first electrode of the fourth transistor is connected with the second electrode of the first transistor, and a second electrode of the fourth transistor is connected with a third level terminal. The second transistor is a photosensitive transistor.

Optionally, the threshold compensating unit is further connected with the output terminal of the driving unit and a seventh scanning signal terminal, and is used for outputting a control voltage to the control terminal of the driving unit, outputting an operating voltage to the input terminal of the driving unit, and compensating a threshold voltage of the driving unit in the control voltage under control of the third scanning line signal terminal, the fourth scanning line signal terminal, the seventh scanning signal terminal and the data line. The threshold compensating unit includes: a fifth transistor, a sixth transistor, a seventh transistor, an eighth transistor and a second capacitor. A gate of the fifth transistor is connected with the fourth scanning signal terminal, a first electrode of the fifth transistor is connected with a first level terminal, and a second electrode of the fifth transistor is connected with the input terminal of the driving unit. A gate of the sixth transistor is connected with the third scanning signal terminal, a first electrode of the sixth transistor is connected with the data line, and a second electrode of the sixth transistor is connected with the input terminal of the driving unit. A gate of the seventh transistor is connected with the seventh scanning signal terminal, a first electrode of the seventh transistor is connected with the third level terminal, and a second electrode of the seventh transistor is connected with the control terminal of the driving unit. A gate of the eighth transistor is connected with the third scanning signal terminal, a first electrode of the eighth transistor is connected with the output terminal of the driving unit, and a second electrode of the eighth transistor is connected with the control terminal of the driving unit; a first electrode of the second capacitor is connected with the control terminal of the driving unit, and a second electrode of the second capacitor is connected with the third level terminal.

Optionally, the first scanning signal terminal and the third scanning signal terminal are connected with a first scanning line; the second scanning signal terminal, the fourth scanning signal terminal and the fifth scanning signal terminal are connected with a second scanning line; and the sixth scanning signal terminal and the seventh scanning signal terminal are connected with a third scanning line.

Optionally, the threshold compensating unit includes: a fifth transistor, a sixth transistor, a first driving transistor and a second capacitor. A gate of the fifth transistor is connected with the third scanning signal terminal, and a first electrode of the fifth transistor is connected with the data line; a gate of the sixth transistor is connected with the fourth scanning signal terminal, a first electrode of the sixth transistor is connected with the control terminal of the driving unit, and a second electrode of the sixth transistor is connected with a third level terminal. A control terminal of the first driving transistor is connected with the control terminal of the driving unit, an input terminal of the first driving transistor is connected with the second electrode of the fifth transistor, and an output terminal of the first driving transistor is connected with the control terminal of the driving unit. A first electrode of the second capacitor is connected with the control terminal of the driving unit, and a second electrode of the second capacitor is connected with a first level terminal and the input terminal of the driving unit.

Optionally, the first scanning signal terminal and the third scanning signal terminal are connected with a first scanning line; the second scanning signal terminal and the fifth scanning signal terminal are connected with a second scanning line; and the fourth scanning signal terminal and the sixth scanning signal terminal are connected with a third scanning line.

Optionally, the display unit includes: a ninth transistor and a light-emitting diode connected in series. A gate of the ninth transistor is connected with the fifth scanning signal terminal, a first electrode of the ninth transistor is connected with the output terminal of the driving unit, a second electrode of the ninth transistor is connected with the first electrode of the light-emitting diode, and a second electrode of the light-emitting diode is connected with a second level terminal.

Optionally, the driving unit is a thin film field effect transistor, the input terminal of the driving unit is a source of the thin film field effect transistor, the control terminal of the driving unit is a gate of the thin film field effect transistor, and the output terminal of the driving unit is a drain of the thin film field effect transistor.

Optionally, the first electrodes of the respective transistors are sources, and the second electrodes of the respective transistors are drains.

In one aspect, there is provided a display device, which comprises any touch display circuit as described above.

The touch display circuit and the display device comprise the photosensitive touch unit, the driving unit, the threshold compensating unit and the display unit, and the photosensitive in cell touch technology is efficiently integrated into the AMOLED display.

BRIEF DESCRIPTION OF THE DRAWINGS

In order to clearly illustrate the technical solution of the embodiments of the present application, the drawings of the embodiments will be briefly described in the following; it is obvious that the described drawings are only related to some embodiments of the present application. Based on the described embodiments herein, those skilled in the art can obtain other embodiment(s), without any inventive work.

DESCRIPTION OF THE EMBODIMENTS

Figure 1:
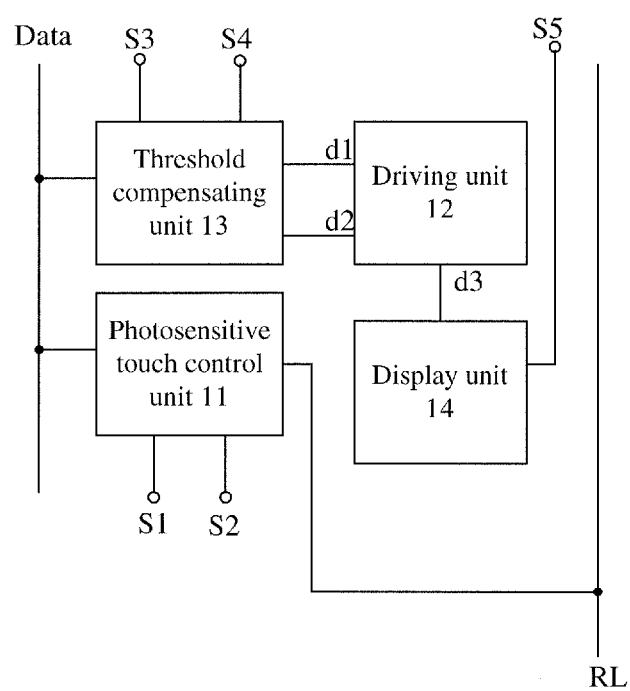
FIG. 1 is a structural schematic diagram of a touch display circuit provided by a first embodiment of the present application.

Hereinafter, the technical solutions of the embodiments of the present application will be described in a clearly and fully understandable way in connection with the drawings in the embodiments of the present application. It is obvious that the described embodiments are just a part but not all of the embodiments of the present application. Based on the described embodiments of the present application herein, those skilled in the art can obtain other embodiment(s), without any inventive work, which should be within the scope of the present application.

Transistors used in all the embodiments of the present application may be thin film transistors or field effect transistors, or other devices having same characteristics. According to functions in the circuit, the transistors used in the embodiments of the present application mainly include a switch transistor and a driving transistor. Since a source and a drain of the switch transistor used herein are symmetrical, the source and the drain are interchangeable. In the embodiments of the present application, in order to distinguish the two electrodes of the transistor except a gate, one of the two electrodes is referred to as the source, and the other electrode is referred to as the drain. According to configuration in the drawings, it is stipulated that a middle terminal of the transistor is the gate, a signal input terminal is the source, and a signal output terminal is the drain. In addition, the switch transistor used in the embodiments of the present application includes a P-type switch transistor and an N-type switch transistor. The P-type switch transistor is turned on when the gate is at a low level, and is turned off when the gate is at a high level. The N-type switch transistor is turned on when the gate is at the high level, and is turned off when the gate is at the low level. The driving transistor includes a P-type driving transistor and an N-type driving transistor. The P-type driving transistor is in an amplified state or a saturated state when a gate voltage is at the low level (the gate voltage is less than a source voltage), and an absolute value of a voltage difference between the gate and the source is greater than a threshold voltage. The N-type driving transistor is in the amplified state or the saturated state when the gate voltage is at the high level (the gate voltage is greater than the source voltage), and the absolute value of the voltage difference between the gate and the source is greater than the threshold voltage.

With reference to FIG. 1, it shows a touch display circuit provided by a first embodiment of the present application. The touch display circuit comprises a photosensitive touch unit 11, a driving unit 12, a threshold compensating unit 13 and a display unit 14.

The photosensitive touch unit 11 is connected with a first scanning signal terminal S1, a second scanning signal terminal S2, a signal detection line RL and a data line Data.

When the first scanning signal terminal S1 inputs a first detection signal, the photosensitive touch unit 11 generates a second detection signal according to light intensity of a touch position and a data signal of the data line Data under control of the second scanning signal terminal S2, and outputs the second detection signal through the signal detection line RL.

The threshold compensating unit 13 is connected with a third scanning line signal terminal S3, a fourth scanning line signal terminal S4, the data line Data and a control terminal and an input terminal d2 of the driving unit 12. The threshold compensating unit 13 is used for outputting a control voltage to the control terminal d1 of the driving unit 12, outputting an operating voltage to the input terminal d2 of the driving unit 12, and compensating a threshold voltage of the driving unit 12 in the control voltage, under control of the third scanning line signal terminal S3, the fourth scanning line signal terminal S4 and the data line Data.

The control terminal d1 and the input terminal d2 of the driving unit 12 are connected with the threshold compensating unit 13, and are used for outputting a driving current to the display unit 14 via an output terminal d3 under control of the control voltage and the operating voltage.

The display unit 14 is connected with the fifth scanning signal terminal S5 and the output terminal d3 of the driving unit 12. The display unit 14 is driven to emit light by the driving current under control of the fifth scanning signal terminal S5.

The above-described touch display circuit comprises the photosensitive touch unit, the driving unit, the threshold compensating unit and the display unit, which efficiently integrates the photosensitive in cell touch technology into the AMOLED display, and meanwhile, an operating current flowing through a light-emitting unit is not affected by the threshold voltage of the corresponding driving unit, which well solves the problem of uneven display luminance caused by shift of the threshold voltage of the driving unit.

First Embodiment

Figure 2:
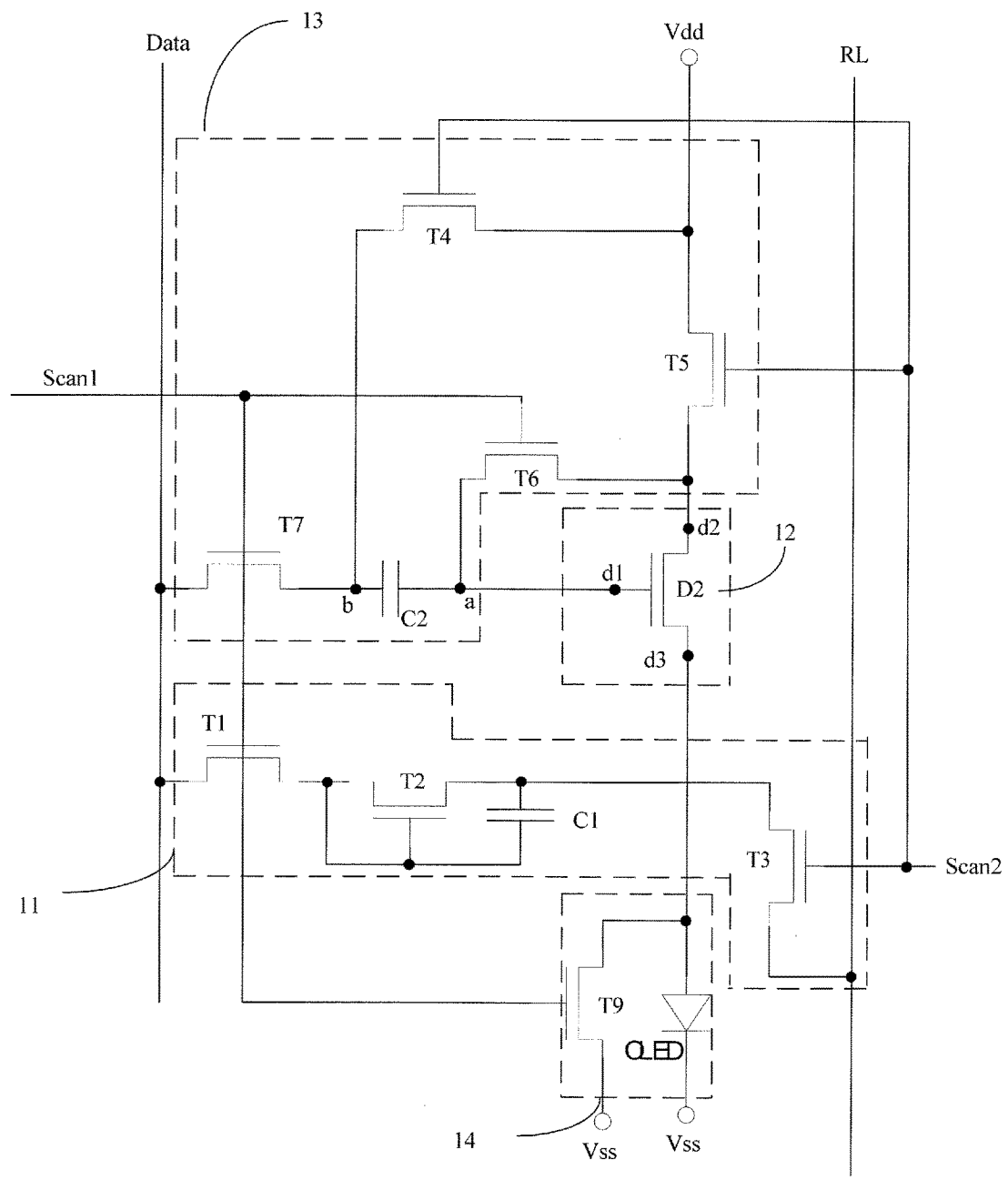
FIG. 2 is a structural schematic diagram of an Implementation Example 1 of the touch display circuit of FIG. 1.
Figure 3:
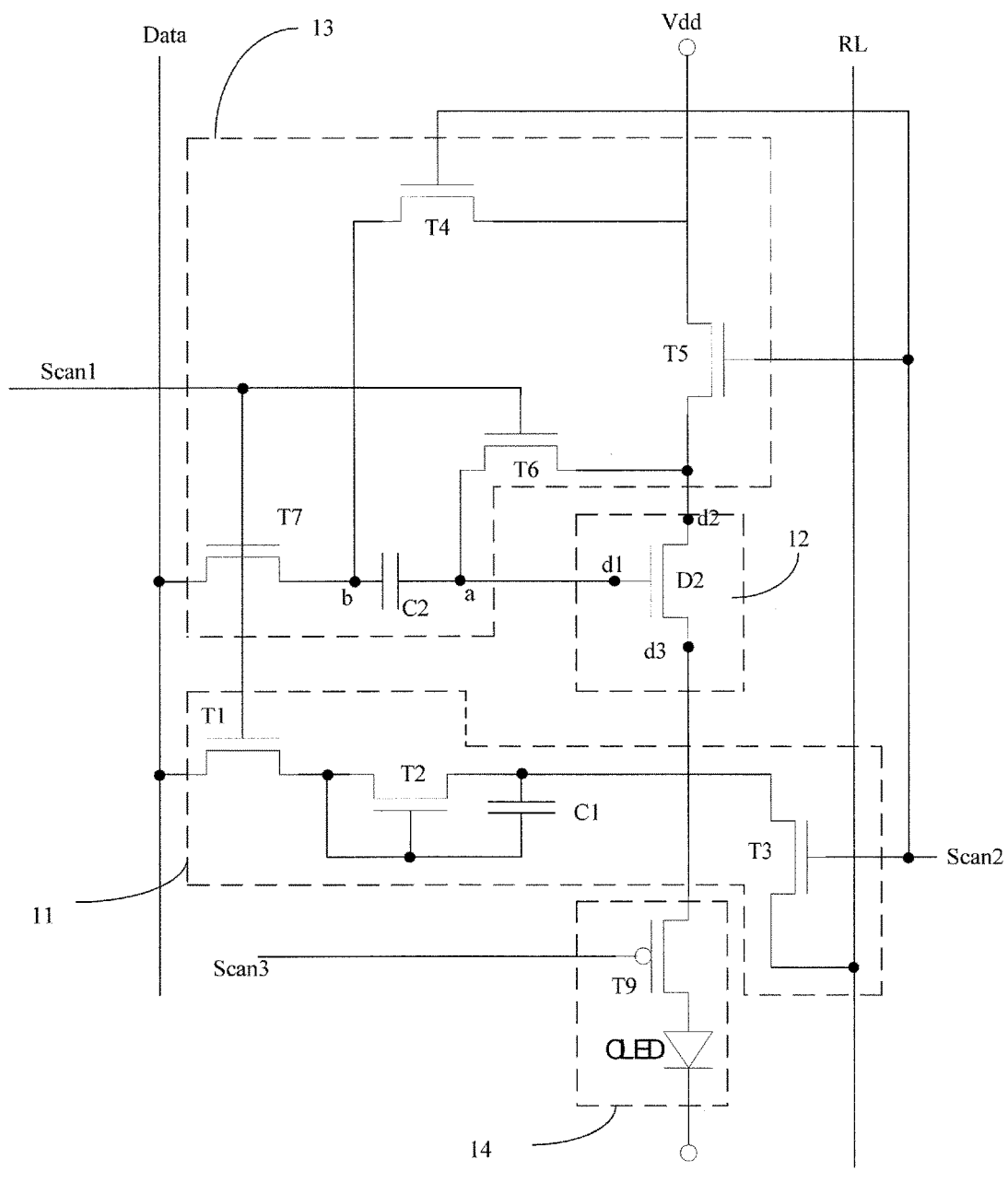
FIG. 3 is a structural schematic diagram of an Implementation Example 2 of the touch display circuit of FIG. 1.

With reference to FIG. 2 and FIG. 3, the photosensitive touch unit 11 includes: a first transistor T1, a second transistor T2, a third transistor T3 and a first capacitor C1.

A gate of the first transistor T1 is connected with the first scanning signal terminal S1. A first electrode of the first transistor T1 is connected with the data line. A signal of the first scanning signal terminal S1 is used for controlling turning on or off of the T1. When the T1 is turned on, a signal of the data line can be output to a second electrode of the T1.

A gate of the second transistor T2 is connected with a first electrode thereof. The first electrode of the second transistor T2 is connected with the second electrode of the first transistor T1. The second transistor T2 is used for outputting the signal of the data line input by the first electrode to a second electrode under control of a gate signal.

A first electrode of the first capacitor C1 is connected with the gate of the second transistor T2. A second electrode of the first capacitor C1 is connected with a second electrode of the second transistor T2. The first capacitor C1 is used for storing a potential difference between the second electrode and the gate of the second transistor T2.

A first electrode of the third transistor T3 is connected with the second electrode of the second transistor T2. A gate of the third transistor T3 is connected with the second scanning signal terminal S2. A second electrode of the third transistor T3 is connected with the signal detection line RL. The third transistor T3 is turned on or off under control of the S2. When the third transistor T3 is turned on, a signal received by the first electrode can be output to the signal detection line RL by the second electrode.

The second transistor T2 is a photosensitive transistor. When light intensity received by the T2 is changed, the T2 can convert the change of the light intensity into an amount of change of the potential difference between the second electrode and the gate, and store the same in the first capacitor C1.

The driving unit 12 is a thin film field effect transistor. An input terminal of the driving unit is a source of the thin film field effect transistor, a control terminal of the driving unit is a gate of the thin film field effect transistor, and an output terminal of the driving unit is a drain of the thin film field effect transistor. The driving unit 12 is marked as D2 in FIG. 2 and FIG. 3. The driving unit 12 is used for outputting the driving current at the output terminal under control of the control terminal and the input terminal.

The threshold compensating unit 13 includes: a fourth transistor T4, a fifth transistor T5, a sixth transistor T6, a seventh transistor T7 and a second capacitor C2.

A gate of the fourth transistor T4 is connected with a fourth scanning signal terminal S4. A first electrode of the fourth transistor T4 is connected with a first level terminal V1. A second electrode of the fourth transistor T4 is connected with a second electrode b of the second capacitor C2. The fourth transistor T4 is turned on or off under control of a signal of the S4. When the T4 is turned on, a level of the first level terminal V1 is written into the second electrode b of the second capacitor C2.

A gate of the fifth transistor T5 is connected with the fourth scanning signal terminal S4. A first electrode of the fifth transistor T5 is connected with the first level terminal V1. A second electrode of the fifth transistor T5 is connected with the input terminal d2 of the driving unit 12. The fifth transistor T5 is turned on or off under control of a signal of the fourth scanning signal terminal S4. When the fifth transistor T5 is turned on, the level of the first level terminal V1 is input into the input terminal d2 of the driving unit 12.

A gate of the sixth transistor T6 is connected with the third scanning signal terminal S3. A first electrode of the sixth transistor T6 is connected with a first electrode a of the second capacitor C2. A second electrode of the sixth transistor T6 is connected with the input terminal d2 of the driving unit 12. The sixth transistor T6 is turned on or off under control of a signal of the third scanning signal terminal S3. When the sixth transistor T6 is turned on, a level of the second electrode of the sixth transistor T6 is written into the first electrode a of the C2.

A gate of the seventh transistor T7 is connected with the third scanning signal terminal S3. A first electrode of the seventh transistor T7 is connected with the data line Data. A second electrode of the seventh transistor T7 is connected with the second electrode b of the second capacitor C2. The seventh transistor T7 is turned on or off under control of the signal of the S3. When the seventh transistor T7 is turned on, a potential of the second electrode b of the seventh transistor T7 is reset by a signal of the data line Data.

The first electrode a of the second capacitor C2 is connected with the control terminal d1 of the driving unit 12.

With reference to FIG. 3, the display unit 14 includes: a ninth transistor T9 and a light-emitting diode OLED connected in series. A gate of the ninth transistor T9 is connected with the fifth scanning signal terminal S5. A first electrode of the ninth transistor T9 is connected with the output terminal d3 of the driving unit 12. A second electrode of the ninth transistor T9 is connected with a first electrode of the light-emitting diode OLED. A second electrode of the light-emitting diode OLED is connected with a second level terminal V2. The ninth transistor T9 is turned on or off under control of the fifth scanning signal terminal S5. When the ninth transistor T9 is turned on, an output current of the output terminal d3 of the driving unit 12 is transmitted to the light-emitting diode OLED.

Alternatively, with reference to FIG. 2, the display unit 14 includes: a ninth transistor T9 and a light-emitting diode OLED connected in parallel. A gate of the ninth transistor T9 is connected with the fifth scanning signal terminal S5. A first electrode of the ninth transistor T9 is connected with the output terminal d3 of the driving unit 12. The second electrode of the ninth transistor T9 is connected with the second level terminal V2. A first electrode of the light-emitting diode OLED is connected with the output terminal d3 of the driving unit 12. A second electrode of the light-emitting diode OLED is connected with the second level terminal V2. The ninth transistor T9 is turned on or off under control of the fifth scanning signal terminal S5. When the ninth transistor T9 is turned on, the two electrodes of the light-emitting diode OLED are short-circuited, and the output terminal d3 of the driving unit 12 is connected with the second level terminal V2. When the T9 is turned off, the output terminal d3 of the driving unit 12 outputs the current to the light-emitting diode OLED.

Figure 4:
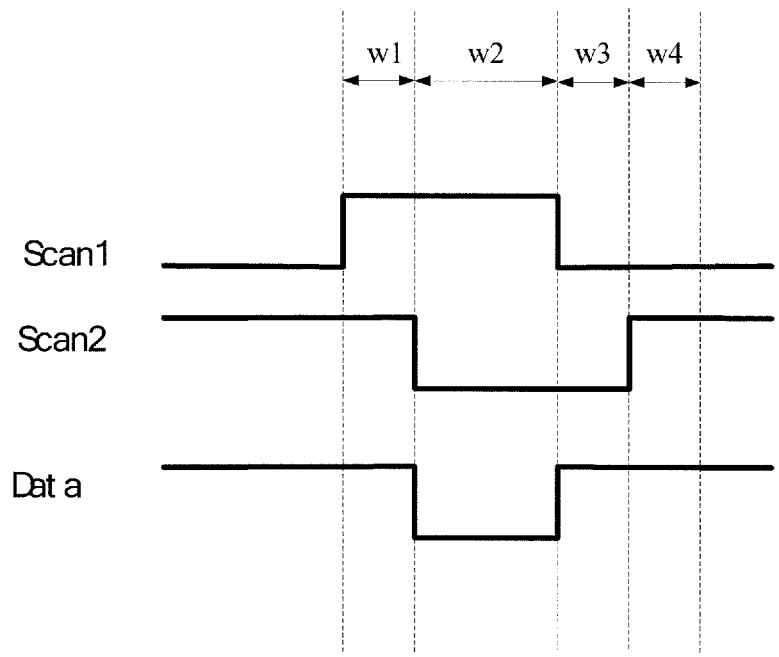
FIG. 4 is a timing status schematic diagram of input signals of the touch display circuit shown in FIG. 2.

With reference to the timing status schematic diagram of the signals shown in FIG. 4, an operating principle of the corresponding touch control circuit of FIG. 2 will be described hereinafter. In FIG. 2, description is provided with all the switch transistors being the N-type transistor which is turned on by the high level as an example. Of course, in FIG. 2 and FIG. 3, since connection ways of the ninth transistor T9 are different, types of the transistor of the T9 therein are also different. Optionally, the first scanning signal terminal S1, the third scanning signal terminal S3 and the fifth scanning signal terminal S5 are connected with a first scanning line Scan1, to input a same timing signal. The second scanning signal terminal S2 and the fourth scanning signal terminal S4 are connected with a second scanning line Scan2, to input a same timing signal. Hereinbefore, different scanning signal terminals are connected with the same scanning line, which can further improve an aperture ratio, and reduce costs. FIG. 4 includes a timing status of the signals on the first scanning line Scan1 and the second scanning line Scan2 as well as the data line Data. The first level terminal V1 provides a high level Vdd. The second level terminal V2 is grounded, providing Vss. Four timing stages are provided as shown in FIG. 4, including: w1, w2, w3 and w4.

In the w1 stage, the Scan1 and the Scan2 as well as the Data are all at the high levels, the T1 and the T3 are turned on, and the storage capacitor C1 and the T2 are reset to restore an initial state. Here, the T2 is used as a photosensitive sensor, preparing in the w1 stage for operation of the photosensitive sensor in a next stage. In addition, at this time, the T4-T7 and the T9 are turned on, and in this procedure, both terminals of the C2 reset the points a and b, both potentials being Vdd.

In the w2 stage, the Scan1 provides a high level, the Scan2 and the Data provide a low level, the T1 is turned on, the T3 is turned off, the T1 outputs a data line coupling voltage Vdata to the gate of the T2, and the T2 forms a potential difference between the drain and the gate by its own potential conversion, and stores the same in the C1. When there is light irradiating the T2, a charging current for the C1 is increased. Meanwhile, in the procedure w2 of the timing diagram, the T6, the T7 and the T9 are turned on, the T4 and the T5 are turned off, the first electrode a of the capacitor C1 discharges at the point a, and discharges the point a through a circuit of T5→D2→T9, until it discharges the point a to Vth (Vth being the threshold voltage of the D2). In this procedure, since the point b is connected with the data line Data, the voltage is Vdata, and after the charging is completed, the potential difference between the point a and the point b will be always maintained at Vth−Vdata. In addition, the T9 is turned on so that the current does not pass through the OLED, which indirectly reduces loss of the OLED.

In the w3 stage, the Scan1 and the Scan2 provide a low level, the Data provides a high level, and all the transistors are turned off, preparing for a next stage. The potential difference between the two points a and b of the two terminals of the C1 is maintained at Vth−Vdata, preparing for a next light emission stage.

In the w4 stage, the Scan1 provides a low level, the Scan2 provides a high level, and at this time, the T1 is turned off, the T3 is turned on, releasing the current previously stored in the C1, and transmitting the signal to the signal detection line RL connected with the T3. The signal on the RL is amplified by an amplifier, and then sent to a processor for data calculation and analysis. If a touch action takes place during this period, a difference value of the photoelectric signal intensity changed before and after touch is compared with a non-touch threshold, based on which, it is determined whether there is touch or not (a change of light irradiation intensity). Thus, a coordinate in an X direction is determined by a Scan1 output point at this time, and a coordinate in a Y direction is determined by the RL. In addition, the w4 stage of the timing is a formal light emission stage of the pixel, and at this time, the T4 and the T5 are turned on, the potential at the point b is changed from Vdata to Vdd. Because the terminal a is in floating connection, the Va and the Vb implement isobaric transition (maintain the original voltage difference, which is Vth−Vdata), and thus, the potential of the point a is Va=Vdd+Vth−Vdata. This procedure is transient, the isobaric transition is completed instantaneously, and meanwhile, it enters into the light emission stage.

The current $I_{OLED}$ flowing into the OLED can be derived from a TFT saturation current formula:

$$I_{OLED} = K(V_{GS} - Vth)^2$$
$$= K[(Vdd + Vth - Vdata) - Voled - Vth]^2$$
$$= K[Vdd - Vdata - Voled]^2$$

Where, Voled is an anode potential of the OLED, Vth is the threshold voltage of the D2, $V_{GS}$ is the voltage between the gate and the source of the D2, $$K = \mu C_{ox} \frac{W}{L},$$

μ and $C_{ox}$ are process constants, W is a TFT channel width, L is a channel length of the thin film transistor, and both W and L are constants optionally designed.

As can be seen from the above formula, the operating current $I_{OLED}$ is no longer affected by Vth, but is only related to Vdata. The problem of shift of the threshold voltage (Vth) caused by a technological process and long-time operation in the driving TFT is well solved, an effect thereof on $I_{OLED}$ is eliminated, and a normal operation of the OLED is ensured.

Figure 5:
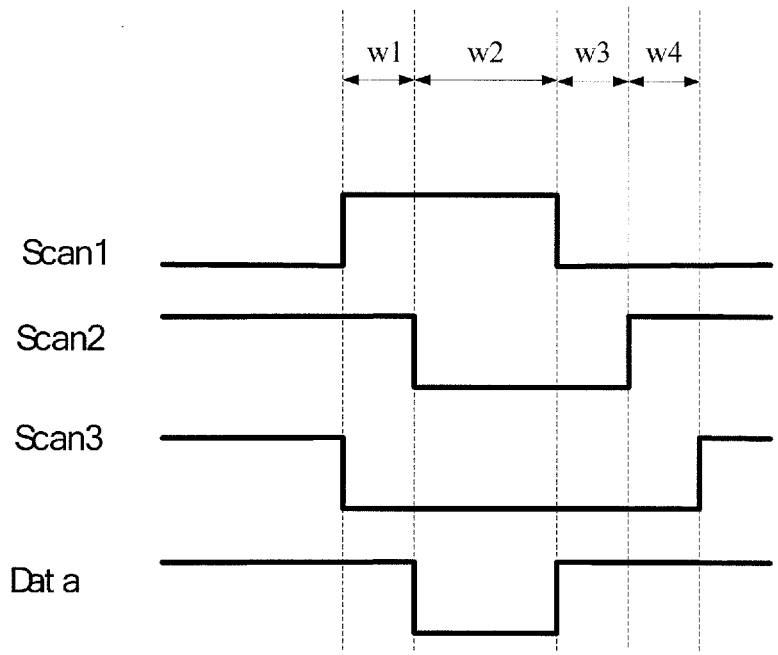
FIG. 5 is a timing status schematic diagram of input signals of the touch display circuit shown in FIG. 3.

Of course, when the circuit shown in FIG. 3 is used, it differs from the circuit shown in FIG. 2 in that since the connection ways of the T9 are different in FIG. 2 and FIG. 3, the types of the transistor T9 are also different. FIG. 5 provides a timing signal status diagram of the circuit shown in FIG. 3. The fifth scanning signal terminal S5 is connected with the third scanning line Scan3. Since the timing signals of the Scan1, the Scan2 and the Data are the same as those in FIG. 4, statuses of other devices except the T9 in the respective timings are the same as the functions and the statuses as described above. The T9 is in a conducting state in all the four stages, i.e., w1-w4. Since in the w1-w3 stages, the D2 does not output the driving current, the T9 only provides a pathway for threshold compensation of the D2 in the w1-w3 stages. The OLED does not display a gray scale in the w1-w3 stages, and in the w4 stage, when the D2 outputs the driving current to the OLED, the OLED displays the gray scale, and the functions of other devices in the corresponding circuit of FIG. 3 will not be described here.

The touch display circuit provided by the embodiment of the present application comprises the photosensitive touch unit, the driving unit, the threshold compensating unit and the display unit, which efficiently integrates the photosensitive in cell touch technology into the AMOLED display, and meanwhile, the operating current flowing through the light-emitting unit is not affected by the threshold voltage of the corresponding driving unit, which well solves the problem of uneven display luminance caused by shift of the threshold voltage of the driving unit.

Second Embodiment

Figure 6:
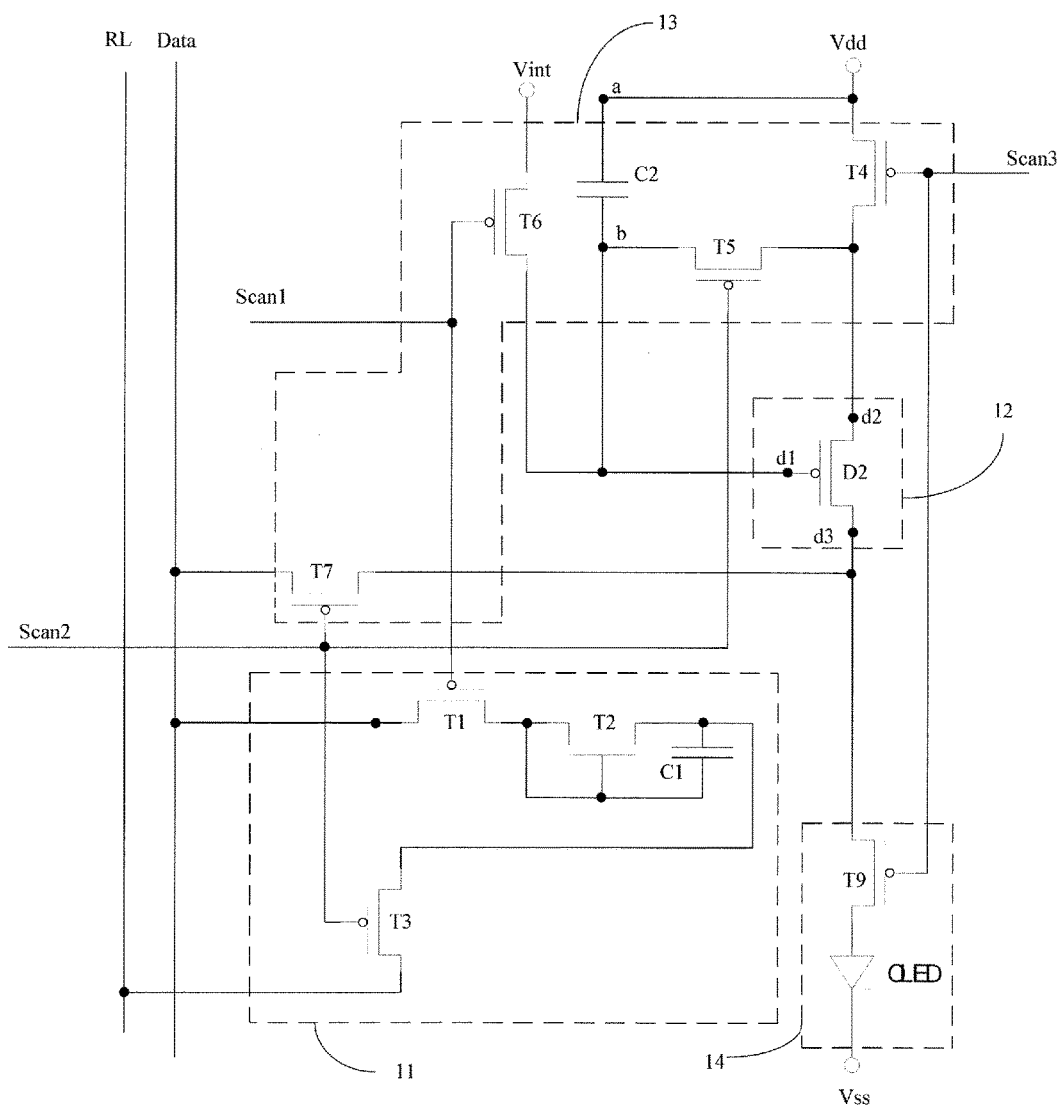
FIG. 6 is a structural schematic diagram of a touch display circuit according to a second embodiment of the present application.

With reference to FIG. 6, the photosensitive touch unit 11 includes: a first transistor T1, a second transistor T2, a third transistor T3 and a first capacitor C1;

A gate of the first transistor T1 is connected with the first scanning signal terminal S1. A first electrode of the first transistor T1 is connected with the data line. A signal of the first scanning signal terminal S1 is used for controlling turning on or off of the T1. When the T1 is turned on, the signal of the data line can be output to a second electrode of the T1.

A gate of the second transistor T2 is connected with a first electrode of the second transistor T2. The first electrode of the second transistor T2 is connected with the second electrode of the first transistor T1. The second transistor T2 is used for outputting the signal of the data line input by the first electrode into a second electrode under control of a gate signal.

A first electrode of the first capacitor C1 is connected with the gate of the second transistor T2. A second electrode of the first capacitor C1 is connected with the second electrode of the second transistor T2. The C1 is used for storing a potential difference between the second electrode and the gate of the T2.

A first electrode of the third transistor T3 is connected with the second electrode of the second transistor T2. A gate of the third transistor T3 is connected with the second scanning signal terminal S2. A second electrode of the third transistor T3 is connected with a signal detection line RL. The third transistor T3 is turned on or off under control of the S2. When the T3 is turned on, a signal received by the first electrode of the T3 can be output to the RL by the second electrode.

The second transistor T2 is a photosensitive transistor. When light intensity received by the second transistor T2 is changed, the second transistor T2 can convert the change of the light intensity into an amount of change of the potential difference between the second electrode and the gate, and store the same in the first capacitor C1.

The driving unit 12 is a thin film field effect transistor. An input terminal of the driving unit is a source of the thin film field effect transistor. A control terminal of the driving unit is a gate of the thin film field effect transistor. An output terminal of the driving unit is a drain of the thin film field effect transistor. The driving unit 12 is used for outputting the driving current at the output terminal under control of the control terminal and the input terminal. The driving unit 12 is marked as D2 in FIG. 6.

The threshold compensating unit 13 is further connected with the output terminal d3 of the driving unit 12 and a sixth scanning signal terminal S6; and is specifically used for outputting a control voltage to the control terminal d1 of the driving unit 12, outputting an operating voltage to the input terminal d2 of the driving unit 12, and compensating a threshold voltage of the driving unit in the control voltage under control of signals of a third scanning line signal terminal S3, a fourth scanning line signal terminal S4, the sixth scanning signal terminal S6 and a data line Data.

The threshold compensating unit 13 includes: a fourth transistor T4, a fifth transistor T5, a sixth transistor T6, a seventh transistor T7 and a second capacitor C2.

A gate of the fourth transistor T4 is connected with the sixth scanning signal terminal S6. A first electrode of the fourth transistor T4 is connected with a first level terminal V1. A second electrode of the fourth transistor T4 is connected with the input terminal d2 of the driving unit 12. The fourth transistor T4 is turned on or off under control of a signal of the S6. When the T4 is turned on, a level of the V1 is written into the input terminal d2 of the driving unit 12.

A first electrode a of the second capacitor C2 is connected with the first level terminal V1, a second electrode b of the second capacitor C2 is connected with the control terminal d1 of the driving unit 12, for storing a potential difference between the terminal V1 and the control terminal d1 of the driving unit 12.

A gate of the fifth transistor T5 is connected with the fourth scanning signal terminal S4, a first electrode of the fifth transistor T5 is connected with the second electrode b of the second capacitor C2, and a second electrode of the fifth transistor T5 is connected with the input terminal d2 of the driving unit 12. The fifth transistor T5 is turned on or off under control of the S4. When the fifth transistor T5 is turned on, a potential of the input terminal d2 of the driving unit 12 is written into the second electrode b of the second capacitor C2.

A gate of the sixth transistor T6 is connected with the third scanning signal terminal S3, a first electrode of the sixth transistor T6 is connected with a third level terminal V3, and a second electrode of the sixth transistor T6 is connected with the second electrode b of the second capacitor C2. The sixth transistor T6 is turned on or off under control of the S3. When the T6 is turned on, a potential of the second electrode b of the second capacitor C2 is reset by a signal of the third level terminal V3.

A gate of the seventh transistor T7 is connected with the fourth scanning signal terminal S4, a first electrode of the seventh transistor T7 is connected with the data line Data, and a second electrode of the seventh transistor T7 is connected with the output terminal d3 of the driving unit 12. The seventh transistor T7 is turned on or off under control of the S4. When the T7 is turned on, a signal of the data line Data is input to the output terminal d3 of the driving unit 12.

The display unit 14 includes: a ninth transistor T9 and a light-emitting diode OLED connected in series.

With reference to FIG. 6, a gate of the ninth transistor T9 is connected with the fifth scanning signal terminal S5, a first electrode of the ninth transistor T9 is connected with the output terminal d3 of the driving unit 12, and a second electrode of the ninth transistor T9 is connected with a first electrode of the light-emitting diode OLED. A second electrode of the light-emitting diode OLED is connected with a second level terminal V2. The ninth transistor T9 is turned on or off under control of the S5. When the T9 is turned on, an output current of the output terminal d3 of the driving unit 12 is transmitted to the light-emitting diode OLED.

Figure 7:
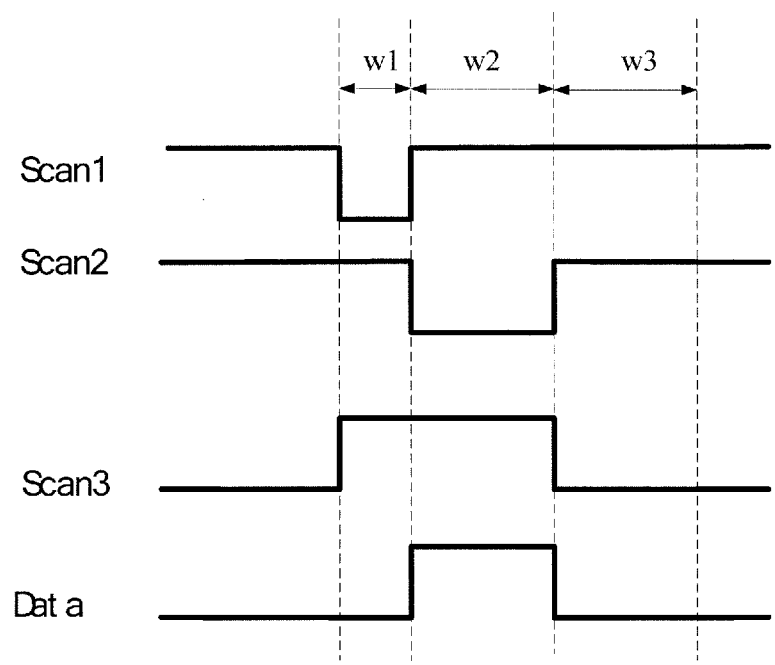
FIG. 7 is a timing status schematic diagram of input signals of the touch display circuit shown in FIG. 6.

With reference to the timing status schematic diagram of the signals shown in FIG. 7, an operating principle of the corresponding touch control circuit of FIG. 6 will be described hereinafter. In FIG. 6, description is provided with the switch transistors T1, T3, T4-T7 and T9 all being the P-type transistors, and T2 being the N-type transistor as an example. Optionally, the first scanning signal terminal S1 and the third scanning signal terminal S3 are connected with a first scanning line Scan1, to input a same timing signal. The second scanning signal terminal S2 and the fourth scanning signal terminal S4 are connected with a second scanning line Scan2, to input a same timing signal. The fifth scanning signal terminal S5 and the sixth scanning signal terminal S6 are connected with a third scanning line Scan3, to input a same timing signal. Hereinbefore, different scanning signal terminals are connected with the same scanning line, which can further improve an aperture ratio, and reduce costs. FIG. 7 includes a timing status of the signals on the first scanning line Scan1, the second scanning line Scan2, the third scanning line Scan3 and the data lines Data. The first level terminal V1 provides a high level Vdd. The second level terminal V2 is grounded, providing Vss. The third level terminal V3 is a low level Vint. The third level terminal V3 may use a grounding mode. Three timing stages are provided as shown in FIG. 7, including: w1, w2 and w3.

In the w1 stage, the Scan1 and the Data provide a low level, the Scan2 and the Scan3 provide a high level, the T1 is turned on, and the storage capacitor C1 and the T2 are reset to restore an initial state. Here, the T2 is used as a photosensitive sensor, preparing in the w1 stage for operation of the photosensitive sensor in a next stage, and the T3 is turned off. The T6 is turned on, and the T4, the T5, the T7 and the T9 are turned off. In this procedure, the point b is reset to the low level connected with the third level terminal, the potential is Vint, and here, it can also be grounded, to reset the previous voltage signal.

In the w2 stage, the Scan1, the Scan3 and the Data provide a high level, the Scan2 provides a low level, the T1 is turned off, and the T3 is turned on. When there is light irradiating the T2, a charging current for the C1 is increased. Meanwhile, since the T3 is turned on, and transmits the signal to the signal detection line RL, the amplified signal is sent to a processor for data calculation and analysis. If a touch action takes place during this period, the T3 compares a difference value of the photoelectric signal intensity changed before and after touch control with a non-touch threshold, and based on this, determines whether there is touch or not (a change of light irradiation intensity). Thus, a coordinate in an X direction is determined by a Scan1 output point at this time, and a coordinate in a Y direction is determined by the RL. Meanwhile, in the procedure w2 of the timing diagram, the T5 and the T7 are turned on, and the T4, the T6 and the T9 are turned off. Since previously, the point b is connected with the low level Vint, D2 is turned on, the data signal Vdata on the Data starts to charge the point b through a transmission circuit of T7→D2→T5, until it charges the point b to Vdata−Vth (which satisfies that a voltage difference between the two electrodes, i.e., the gate and source of the driving unit D2 is Vth, wherein Vth is the threshold voltage of the D2). In this procedure, since a ground potential of the point a is always Vdd, after the charging is completed, the potential of the point b will be always maintained at Vdata−Vth. In addition, the T9 is turned off so that the current does not pass through the OLED, which indirectly reduces life loss of the OLED.

In the w3 stage, the Scan1 and the Scan2 provide a low level, the Scan3 and the Data provide a high level. In this stage, both the T1 and the T3 are turned off. The W3 stage is a formal light emission stage of the pixel. At this time, the potential of the input terminal d2 (the source) of the driving unit D2 is switched in Vdd, and the current passes through T4→D2→T9, so that the OLED starts to emit light.

The current $I_{OLED}$ flowing into the OLED can be derived from a TFT saturation current formula:

$$I_{OLED} = K(V_{GS} - Vth)^2$$
$$= K[Vdd - (Vdata - Vth) - Vth]^2$$
$$= K[Vdd - Vdata]^2$$

Where, Vth is the threshold voltage of the D2, $V_{GS}$ is the voltage between the gate and the source of the D2, $$K = \mu C_{ox} \frac{W}{L},$$

μ and $C_{ox}$ are process constants, W is a TFT channel width, L is a channel length of the thin film transistor, and both W and L are constants optionally designed.

As can be seen from the above formula, the operating current $I_{OLED}$ is no longer affected by Vth, but is only related to Vdata. The problem of shift of the threshold voltage (Vth) caused by a technological process and long-time operation in the driving TFT is well solved, an effect thereof on $I_{OLED}$ is eliminated, and a normal operation of the OLED is ensured.

The touch display circuit provided by the embodiment of the present application comprises the photosensitive touch unit, the driving unit, the threshold compensating unit and the display unit, which efficiently integrates the photosensitive in cell touch technology into the AMOLED display, and meanwhile, the operating current flowing through the light-emitting unit is not affected by the threshold voltage of the corresponding driving unit, which well solves the problem of uneven display luminance caused by shift of the threshold voltage of the driving unit.

Third Embodiment

Figure 8:
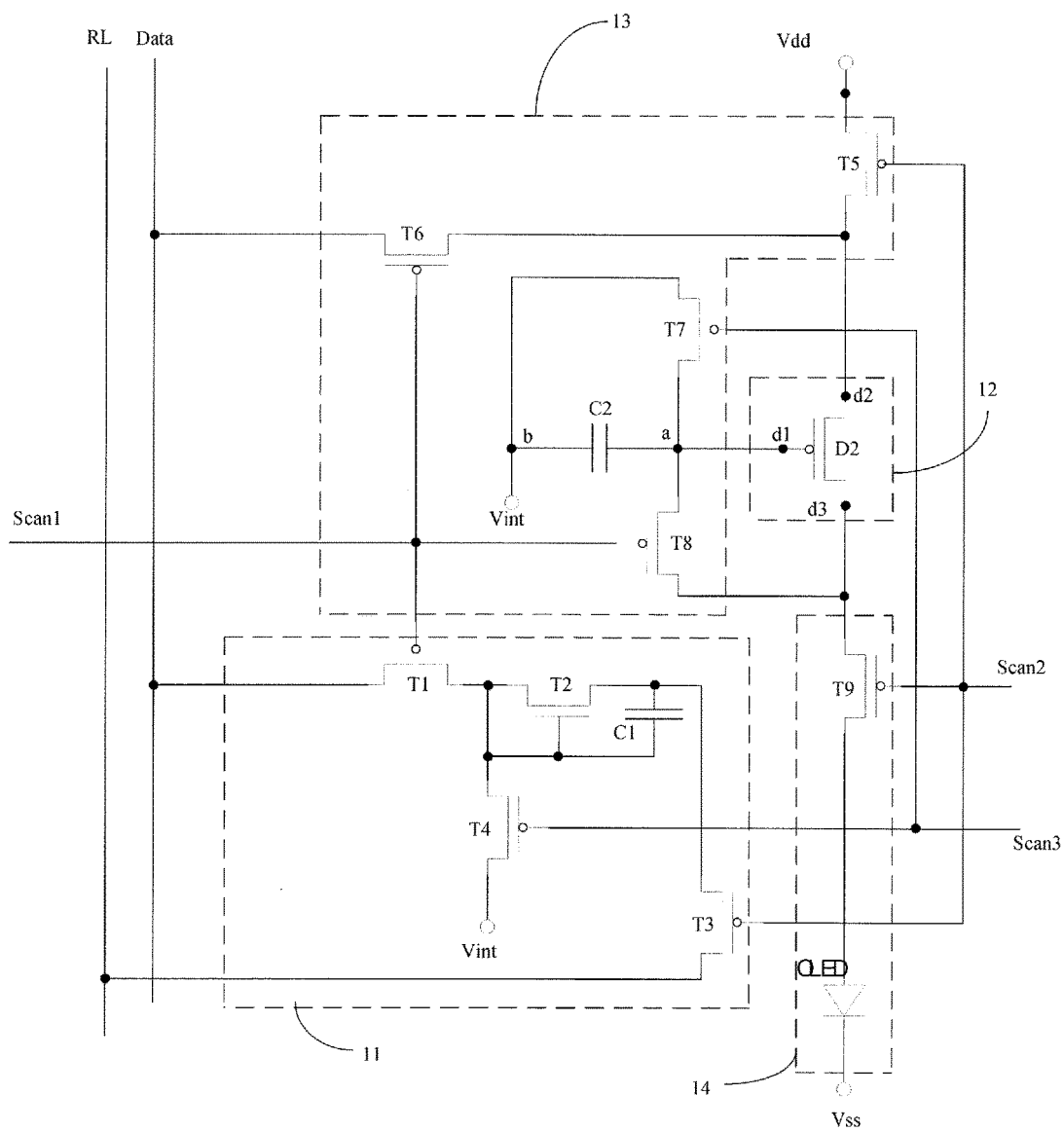
FIG. 8 is a structural schematic diagram of a touch display circuit according to a third embodiment of the present application.

With reference to FIG. 8, the photosensitive touch unit 11 is further connected with a sixth scanning signal terminal S6.

The photosensitive touch unit 11 includes: a first transistor T1, a second transistor T2, a third transistor T3, a fourth transistor T4 and a first capacitor C1;

A gate of the first transistor T1 is connected with the first scanning signal terminal S1. A first electrode of the first transistor T1 is connected with the data line Data. A signal of the first scanning signal terminal S1 is used for controlling turning on or off of the T1. When the T1 is turned on, the signal of the data line can be output to a second electrode of the T1.

A gate of the second transistor T2 is connected with a first electrode of the second transistor T2. The first electrode of the second transistor T2 is connected with the second electrode of the first transistor T1. The second transistor T2 is used for outputting the signal of the data line input by the first electrode to a second electrode under control of a gate signal.

A first electrode of the first capacitor C1 is connected with the gate of the second transistor T2. A second electrode of the first capacitor C1 is connected with the second electrode of the second transistor T2. The first capacitor C1 is used for storing a potential difference between the second electrode and the gate of the T2.

A first electrode of the third transistor T3 is connected with the second electrode of the second transistor T2. A gate of the third transistor T3 is connected with the second scanning signal terminal S2. A second electrode of the third transistor T3 is connected with a signal detection line RL. The third transistor T3 is turned on or off under control of the second scanning signal terminal S2. When the T3 is turned on, a signal received by the first electrode can be output to the RL by the second electrode.

A gate of the fourth transistor T4 is connected with the sixth scanning signal terminal S6. A first electrode of the fourth transistor T4 is connected with the second electrode of the first transistor T1. A second electrode of the fourth transistor T4 is connected with a third level terminal V3. The fourth transistor T4 is turned on or off under control of the S6. When the T4 is turned on, a potential of the second electrode of the first transistor T1 is reset by a signal of the third level terminal V3.

The second transistor T2 is a photosensitive transistor. When light intensity received by the T2 is changed, the T2 can convert the change of the light intensity into an amount of change of the potential difference between the second electrode and the gate, and store the same in the C1.

The driving unit 12 is a thin film field effect transistor. An input terminal d2 of the driving unit 12 is a source of the thin film field effect transistor. A control terminal d1 of the driving unit 12 is a gate of the thin film field effect transistor. An output terminal d3 of the driving unit 12 is a drain of the thin film field effect transistor. The driving unit 12 is marked as D2 in FIG. 8. The driving unit 12 is used for outputting the driving current at the output terminal under control of the control terminal and the input terminal.

The threshold compensating unit 13 is further connected with the output terminal d3 of the driving unit 12 and a seventh scanning signal terminal S7. The threshold compensating unit 13 outputs a control voltage to the control terminal d1 of the driving unit 12, outputs an operating voltage to the input terminal d2 of the driving unit 12, and compensates a threshold voltage of the driving unit in the control voltage under control of signals of the third scanning line signal terminal S3, the fourth scanning line signal terminal S4, the seventh scanning signal terminal S7 and the data line Data.

The threshold compensating unit 13 includes: a fifth transistor T5, a sixth transistor T6, a seventh transistor T7, an eighth transistor T8 and a second capacitor C2;

A gate of the fifth transistor T5 is connected with the fourth scanning signal terminal S4. A first electrode of the fifth transistor T5 is connected with the first level terminal V1. A second electrode of the fifth transistor T5 is connected with the input terminal d2 of the driving unit 12. The fifth transistor T5 is turned on or off under control of the signal of the S4. When the T5 is turned on, a level of the V1 is written into the input terminal d2 of the driving unit 12.

A gate of the sixth transistor T6 is connected with the third scanning signal terminal S3. A first electrode of the sixth transistor T6 is connected with the data line Data. A second electrode of the sixth transistor T6 is connected with the input terminal d2 of the driving unit 12. The sixth transistor T6 is turned on or off under control of a signal of the S3. When the T6 is turned on, the signal of the data line Data is written into the input terminal d2 of the driving unit 12.

A gate of the seventh transistor T7 is connected with the seventh scanning signal terminal S7. A first electrode of the seventh transistor T7 is connected with the third level terminal V3. A second electrode of the seventh transistor T7 is connected with the control terminal d1 of the driving unit 12. The seventh transistor T7 is turned on or off under control of a signal of the S7. When the seventh transistor T7 is turned on, a potential of a first electrode a of the capacitor C2 is reset by a level of the third level terminal V3.

A gate of the eighth transistor T8 is connected with the third scanning signal terminal S3. A first electrode of the eighth transistor T8 is connected with the output terminal d3 of the driving unit 12. A second electrode of the eighth transistor T8 is connected with the control terminal d1 of the driving unit 12. The eighth transistor T8 is turned on or off under control of the signal of the S3. When the T8 is turned on, a signal of the output terminal d3 of the driving unit 12 is written into the first electrode a of the capacitor C2.

The first electrode a of the second capacitor C2 is connected with the control terminal d1 of the driving unit 12. A second electrode b of the second capacitor C2 is connected with the third level terminal V3. The second capacitor C2 stores a potential difference between the control terminal d1 of the driving unit 12 and the third level terminal V3.

The display unit 14 includes: a ninth transistor T9 and a light-emitting diode OLED connected in series. With reference to FIG. 8, a gate of the ninth transistor T9 is connected with the fifth scanning signal terminal S5; a first electrode of the ninth transistor T9 is connected with the output terminal d3 of the driving unit 12, a second electrode of the ninth transistor T9 is connected with a first electrode of the light-emitting diode OLED; a second electrode of the light-emitting diode OLED is connected with a second level terminal V2; and a first electrode of the light-emitting diode OLED is connected with the output terminal d3 of the driving unit 12. The T9 is turned on or off under control of the S5. When the T9 is turned on, an output current of the output terminal d3 of the driving unit 12 is transmitted to the light-emitting diode OLED.

Figure 9:
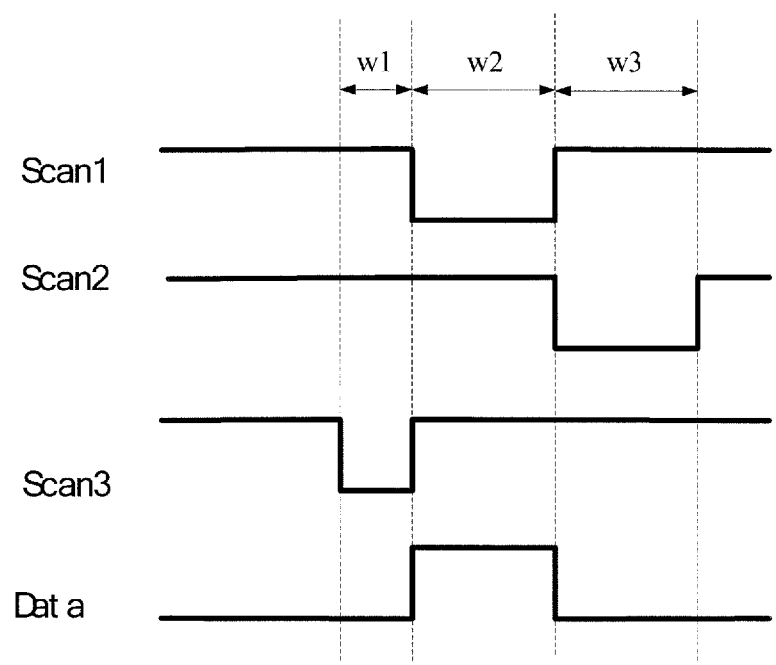
FIG. 9 is a timing status schematic diagram of input signals of the touch display circuit shown in FIG. 8.

With reference to the timing status schematic diagram of the signals shown in FIG. 9, an operating principle of the corresponding touch control circuit of FIG. 8 will be described hereinafter. In FIG. 8, description is provided with the switch transistors T1 and T3-T9 all being the P-type transistors, and T2 being the N-type transistor as an example. Optionally, the first scanning signal terminal S1 and the third scanning signal terminal S3 are connected with a first scanning line Scan1, to input a same timing signal; the second scanning signal terminal S2, the fourth scanning signal terminal S4 and the fifth scanning signal terminal S5 are connected with a second scanning line Scan2, to input a same timing signal; and the sixth scanning signal terminal S6 and the seventh scanning signal terminal S7 are connected with a third scanning line Scan3, to input a same timing signal. Hereinbefore, different scanning signal terminals are connected with the same scanning line, which can further improve an aperture ratio, and reduce costs. FIG. 9 includes a timing status of the signals on the first scanning line Scan1, the second scanning line Scan2, the third scanning line Scan3 and the data line Data. The first level terminal V1 provides a high level Vdd. The second level terminal V2 is grounded, providing Vss. The third level terminal V3 is a low level Vint. The third level terminal V3 may use a grounding mode. Three timing stages are provided as shown in FIG. 9, including: w1, w2 and w3.

In the w1 stage, the Scan3 and the Data provide a low level, the Scan1 and the Scan2 provide a high level, the T4 is turned on, to be switched in the low level Vint of the third level terminal V3, and the storage capacitor C1 and the T2 are reset to restore an initial state. Here, the T2 is used as a photosensitive sensor, preparing in the w1 stage for operation of the photosensitive sensor in a next stage, and the T1 and the T3 are turned off. In addition, the T7 is turned on, and the T4, the T5, the T6, the T7, the T8 and the T9 are turned off; in this procedure, the points a and b are reset to the low level connected with the third level terminal, the potential is Vint, and here, it can also be grounded, to reset the previous voltage signal.

In the w2 stage, the Scan2, the Scan3 and the Data provide a high level, the Scan1 provides a low level, the T1 is turned on, and the T3 and the T4 are turned off, the T1 outputs a data line coupling voltage Vdata to the gate of the T2, and the T2 forms a potential difference between the drain and the gate to be stored in the C1 by its own potential conversion. When there is light irradiating the T2, a charging current for the C1 is increased. Meanwhile, in the w2 stage, the T6 and the T8 are turned on, the T5, the T7 and the T9 are turned off, the data signal Vdata on the Data starts to charge the point a through a transmission path of T6→D2→T8, until it charges the point a to Vdata−Vth (which satisfies that a voltage difference between the two electrodes, i.e., the gate and source of the D2 is Vth, wherein Vth is the threshold voltage of the D2). In this procedure, since a ground potential of the point b is always 0, after the charging is completed, the potential of the point a will be always maintained at Vdata−Vth. In addition, the T9 is turned off so that the current does not pass through the OLED, which indirectly reduces life loss of the OLED.

In the w3 stage, the Scan1 and the Scan3 provide a high level, the Scan2 and the Data provide a low level, and in this stage, both the T1 and the T4 are turned off, and the T3 is turned on. Since the T3 is turned on, and transmits the signal stored by the C1 in the previously stage to the signal detection line RL, the signal on the RL is amplified by an amplifier, and is sent to a processor for data calculation and analysis. If a touch action takes place during this period, a difference value of the photoelectric signal intensity changed before and after touch control is compared with a non-touch threshold, based on which, it is determined whether there is touch or not (a change of light irradiation intensity). Thus, a coordinate in an X direction is determined by a Scan1 output point at this time, and a coordinate in a Y direction is determined by the RL.

The w3 stage is a formal light emission stage of the pixel, the T5 and the T9 are turned on, the T6, the T7 and the T8 are turned off, the potential of the point a is maintained at Vdata−Vth, the input terminal d2 (the source) of the D2 is switched in Vdd, and the current passes through T5→D2→T9, so that the OLED starts to emit light.

The current $I_{OLED}$ flowing into the OLED can be derived from a TFT saturation current formula:

$$I_{OLED} = K(V_{GS} - Vth)^2$$
$$= K[Vdd - (Vdata - Vth) - Vth]^2$$
$$= K[Vdd - Vdata]^2$$

wherein, Vth is the threshold voltage of the D2, $V_{GS}$ is the voltage between the gate and the source of the D2, $$K = \mu C_{ox} \frac{W}{L},$$

$\mu$ and $C_{ox}$ are process constants, W is a TFT channel width, L is a channel length of the thin film transistor, and both W and L are constants optionally designed.

As can be seen from the above formula, the operating current $I_{OLED}$ is no longer affected by Vth, but is only related to Vdata. The problem of shift of the threshold voltage (Vth) caused by a technological process and long-time operation in the driving TFT is well solved, an effect thereof on $I_{OLED}$ is eliminated, and a normal operation of the OLED is ensured.

The touch display circuit provided by the embodiment of the present application comprises the photosensitive touch unit, the driving unit, the threshold compensating unit and the display unit, which efficiently integrates the photosensitive in cell touch technology into the AMOLED display, and meanwhile, the operating current flowing through the light-emitting unit is not affected by the threshold voltage of the corresponding driving unit, which well solves the problem of uneven display luminance caused by shift of the threshold voltage of the driving unit.

Fourth Embodiment

Figure 10:
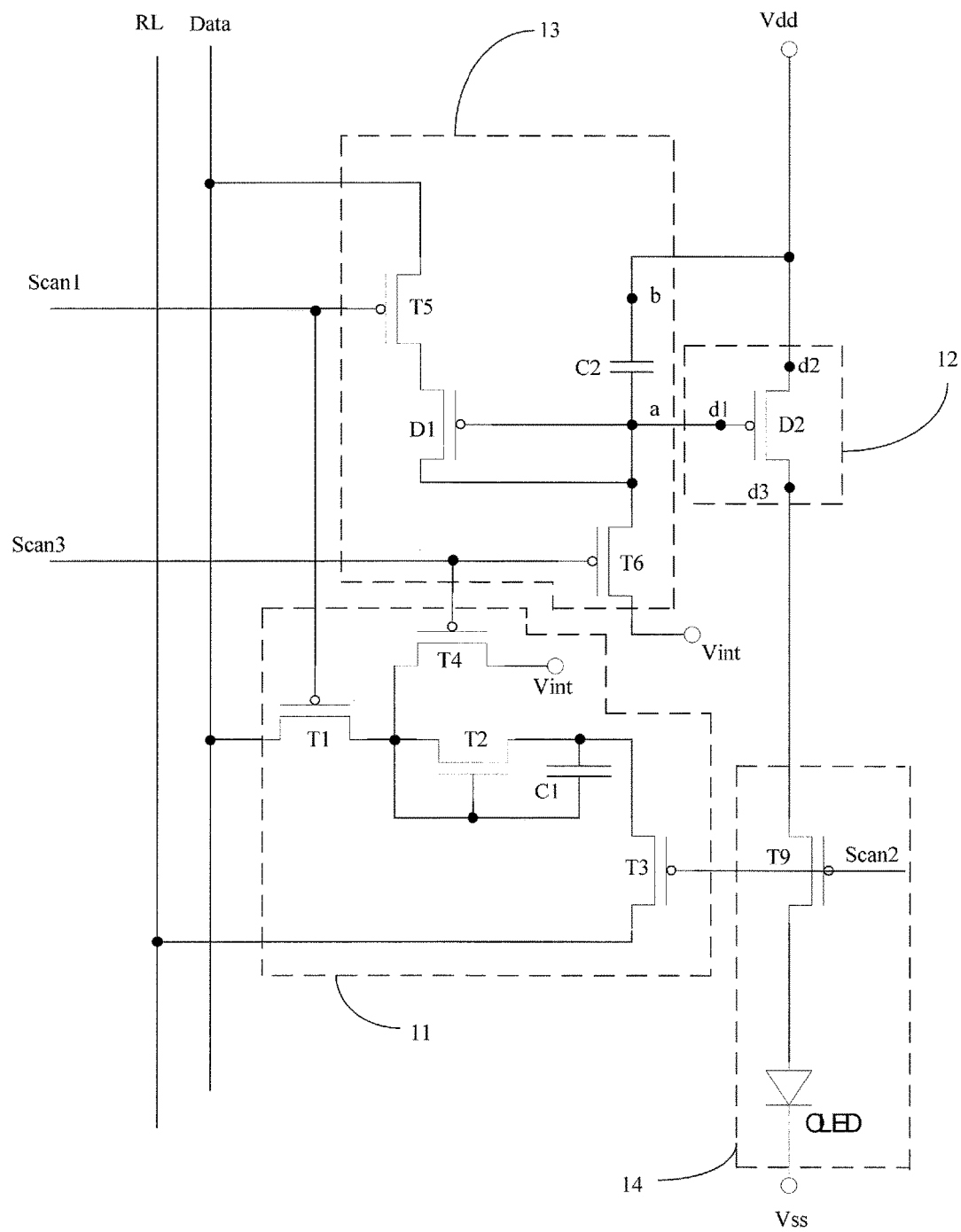
FIG. 10 is a structural schematic diagram of a touch display circuit according to a fourth embodiment of the present application.

With reference to FIG. 10, the photosensitive touch unit 11 is further connected with a sixth scanning signal terminal S6.

The photosensitive touch unit 11 includes: a first transistor T1, a second transistor T2, a third transistor T3, a fourth transistor T4 and a first capacitor C1;

A gate of the first transistor T1 is connected with the first scanning signal terminal S1. A first electrode of the first transistor T1 is connected with the data line Data. A signal of the first scanning signal terminal S1 is used for controlling turning on or turning off of the T1. When the T1 is turned on, the signal of the data line can be output to a second electrode of the T1.

A gate of the second transistor T2 is connected with a first electrode of the second transistor T2. The first electrode of the second transistor T2 is connected with the second electrode of the first transistor T1. The T2 is used for outputting the signal of the data line input by the first electrode into a second electrode under control of a gate signal.

A first electrode of the first capacitor C1 is connected with the gate of the second transistor T2. A second electrode of the first capacitor C1 is connected with the second electrode of the second transistor T2. The first capacitor C1 is used for storing a potential difference between the second electrode and the gate of the T2.

A first electrode of the third transistor T3 is connected with the second electrode of the second transistor T2. A gate of the third transistor T3 is connected with the second scanning signal terminal S2. A second electrode of the third transistor T3 is connected with a signal detection line RL. The third transistor T3 is turned on or off under control of the second scanning signal terminal S2. When the T3 is turned on, a signal received by the first electrode can be output to the RL by the second electrode.

A gate of the fourth transistor T4 is connected with the sixth scanning signal terminal S6. A first electrode of the fourth transistor T4 is connected with the second electrode of the first transistor T1. A second electrode of the fourth transistor T4 is connected with a third level terminal V3. The fourth transistor T4 is turned on or off under control of the S6. When the T4 is turned on, a potential of the second electrode of the first transistor T1 is reset by a signal of the third level terminal V3.

The second transistor T2 is a photosensitive transistor. When light intensity received by the T2 is changed, the T2 can convert the change of the light intensity into an amount of change of the potential difference between the second electrode and the gate, and store the same in the C1.

The driving unit 12 is a thin film field effect transistor. An input terminal d2 of the driving unit 12 is a source of the thin film field effect transistor. A control terminal d1 of the driving unit 12 is a gate of the thin film field effect transistor. An output terminal d3 of the driving unit 12 is a drain of the thin film field effect transistor. The driving unit 12 is marked as D2 in FIG. 10. The driving unit 12 is used for outputting the driving current at the output terminal under control of the control terminal and the input terminal.

The threshold compensating unit 13 includes: a fifth transistor T5, a sixth transistor T6, a first driving transistor D1 and a second capacitor C2.

A gate of the fifth transistor T5 is connected with the third scanning signal terminal S3. A first electrode of the fifth transistor T5 is connected with the data line Data. The fifth transistor T5 is turned on or off under control of the signal of the third scanning signal terminal S3. When the T5 is turned on, a signal of the data line Data is input to a second electrode of the T5.

A gate of the sixth transistor T6 is connected with the fourth scanning signal terminal S4. A first electrode of the sixth transistor T6 is connected with the control terminal d1 of the driving unit 12. A second electrode of the sixth transistor T6 is connected with the third level terminal V3. The sixth transistor T6 is turned on or off under control of the signal of the fourth scanning signal terminal S4. When the T6 is turned on, a potential of a first electrode a of the second capacitor C2 is reset by a level of the third level terminal V3.

A control terminal of the first driving transistor D1 is connected with the control terminal d1 of the driving unit 12. An input terminal of the first driving transistor D1 is connected with the second electrode of the fifth transistor T5. An output terminal of the first driving transistor D1 is connected with the control terminal d1 of the driving unit 12. The first driving transistor D1 is used for writing an output terminal signal of the D1 into the first electrode a of the second capacitor C2 under control of signals of the control terminal d1 of the driving unit 12 and the second electrode of the fifth transistor T5.

The first electrode a of the second capacitor C2 is connected with the control terminal d1 of the driving unit 12. A second electrode b of the second capacitor C2 is connected with the first level terminal V1 and the input terminal d2 of the driving unit 12. The second capacitor C2 is used for storing a potential difference between the first level terminal V1 and the input terminal d2 of the driving unit 12.

The display unit 14 includes: a ninth transistor T9 and a light-emitting diode OLED.

With reference to FIG. 10, a gate of the ninth transistor T9 is connected with the fifth scanning signal terminal S5; a first electrode of the ninth transistor T9 is connected with the output terminal d3 of the driving unit 12, a second electrode of the ninth transistor T9 is connected with a first electrode of the light-emitting diode OLED; a second electrode of the light-emitting diode OLED is connected with a second level terminal V2; a first electrode of the light-emitting diode OLED is connected with the output terminal d3 of the driving unit 12; and the second electrode of the light-emitting diode OLED is connected with the second level terminal V2. The T9 is turned on or off under control of the S5. When the T9 is turned on, the output terminal d3 of the driving unit 12 outputs a current to the light-emitting diode OLED.

Figure 11:
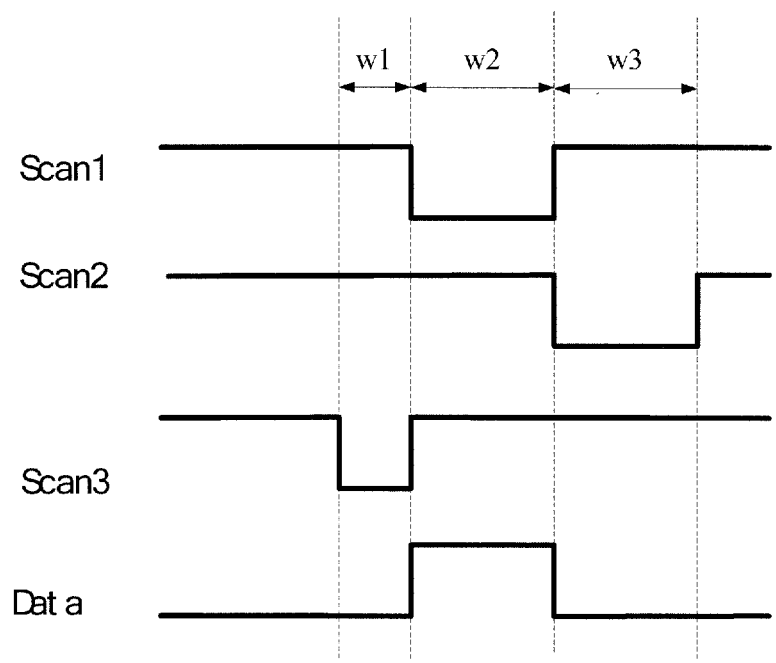
FIG. 11 is a timing status schematic diagram of input signals of the touch display circuit shown in FIG. 10.

With reference to the timing status schematic diagram of the signals shown in FIG. 11, an operating principle of the corresponding touch control circuit of HU 10 will be described hereinafter. In FIG. 10, description is provided with the switch transistors T1 and T3-T6 all being the P-type transistors, and T2 being the N-type transistor as an example. Optionally, the first scanning signal terminal S1 and the third scanning signal terminal S3 are connected with a first scanning line Scan1, to input a same timing signal; the second scanning signal terminal S2 and the fifth scanning signal terminal S5 are connected with a second scanning line Scan2, to input a same timing signal; and the fourth scanning signal terminal S4 and the sixth scanning signal terminal S6 are connected with a third scanning line Scan3, to input a same timing signal. Hereinbefore, different scanning signal terminals are connected with the same scanning line, which can further improve an aperture ratio and reduce costs. FIG. 11 includes a timing status of the signals on the first scanning line Scan1, the second scanning line Scan2, the third scanning line Scan3 and the data line Data. The first level terminal V1 provides a high level Vdd. The second level terminal V2 is grounded, providing Vss. The third level terminal V3 is a low level Vint, and the third level terminal V3 may use a grounding mode. Three timing stages are provided as shown in FIG. 13, including w1, w2 and w3.

In the w1 stage, the Scan1 and the Scan2 provide a high level, the Scan3 and the Data provide a low level, the T4 is turned on, to be switched in the low level Vint of the third level terminal V3, and the storage capacitor C1 and the T2 are reset to restore an initial state. Here, the T2 is used as a photosensitive sensor, preparing for operation of the photosensitive sensor in a next stage in the w1 stage, and the T1 and the T3 are turned off. In addition, the T6 is turned on, and the T5 and the T9 are turned off; in this procedure, the point a is reset to the low level connected with the third level terminal, the potential is Vint, and here, it can also be grounded, to reset the previous voltage signal.

In the w2 stage, the Scan2, the Scan3 and the Data provide a high level, the Scan1 provides a low level, the T1 is turned on, and the T3 and the T4 are turned off, the T1 outputs a data line coupling voltage Vdata to the gate of the T2, and the T2, by its own potential conversion, forms a potential difference between the drain and the gate, to be stored in the C1. When there is light irradiating the T2, a charging current for the C1 is increased. In the w2 stage of the timing diagram procedure, the T5 and the D1 (the potential of the gate is a low level Vint, which satisfies a conducting condition of a driving TFT) are turned on, the T6 and the T9 are turned off, the data signal Vdata on the Data starts to charge the point a through a transmission path of T5→D1→C1, until it charges the point a to Vdata−Vth1 (which satisfies that a voltage difference between the two electrodes, i.e., the gate and source of the D1 is Vth1, wherein Vth1 is the threshold voltage of the DD. In addition, the T9 is turned off so that the current does not pass through the OLED, which indirectly reduces life loss of the OLED.

In the w3 stage, the Scan1 and the Scan3 provide a high level, the Scan2 and the Data provide a low level, and in this stage, both the T1 and the T4 are turned off, and the T3 is turned on. Since the T3 is turned on, and transmits the signal stored by the C1 in the previously stage to the signal detection line RL, the signal on the RL is amplified by an amplifier, and is sent to a processor for data calculation and analysis. If a touch action takes place during this period, a difference value of the photoelectric signal intensity changed before and after touch control is compared with a non-touch threshold, based on which, it is determined whether there is touch or not (a change of light irradiation intensity); and thus, a coordinate in an X direction is determined by a Scan1 output point at this time, and a coordinate in a Y direction is determined by the RL.

Meanwhile, the w3 stage is a formal light emission stage of the pixel, the T9 is turned on, the T5 and the T6 are turned off, the potential of the point a is maintained at Vdata−Vth, the input terminal d2 (the source) of the D2 is switched in Vdd, and the current passes through D2→T9, so that the OLED starts to emit light.

The current $I_{OLED}$ flowing into the OLED can be derived from a TFT saturation current formula:

$$I_{OLED} = K(V_{GS} - Vth)^2$$
$$= K[Vdd - (Vdata - Vth1) - Vth2]^2$$
$$= K[Vdd - Vdata]^2$$

Where, in the formula, Vth1 and Vth2 are respectively threshold voltages of the D1 and the D2, and according to a mirror circuit principle, it is considered that Vth1 and Vth2 are approximately equal, i.e., Vth1=Vth2. $V_{GS}$ is the voltage between the gate and the source of the D2, $$K = \mu C_{ox} \frac{W}{L},$$

$\mu$ and $C_{ox}$ are process constants, W is a TFT channel width, L is a channel length of the thin film transistor, and both W and L are constants optionally designed.

As can be seen from the above formula, the operating current $I_{OLED}$ is no longer affected by Vth, but is only related to Vdata. The problem of shift of the threshold voltage (Vth) caused by a technological process and long-time operation in the driving TFT is well solved, an effect thereof on $I_{OLED}$ is eliminated, and a normal operation of the OLED is ensured.

The touch display circuit provided by the embodiment of the present application comprises the photosensitive touch unit, the driving unit, the threshold compensating unit and the display unit, which efficiently integrates the photosensitive in cell touch technology into the AMOLED display, and meanwhile, the operating current flowing through the light-emitting unit is not affected by the threshold voltage of the corresponding driving unit, which well solves the problem of uneven display luminance caused by shift of the threshold voltage of the driving unit.

An embodiment of the present application provides a display device, comprising the above-described touch display circuit.

Figure 12:
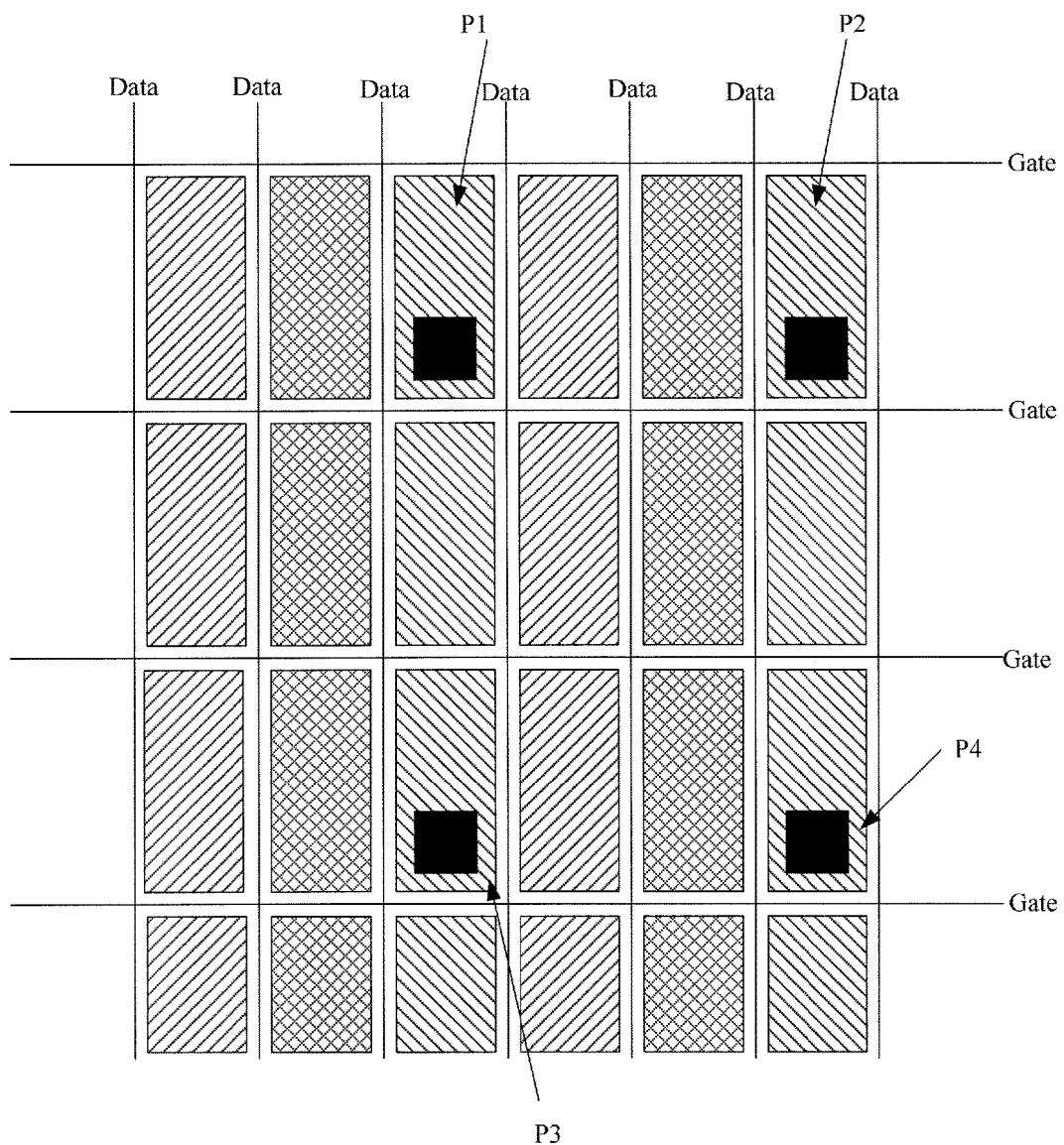
FIG. 12 is a pixel distribution schematic diagram of a display device provided by an embodiment of the present application.

Distribution density of pixel units of the touch display circuit provided by the embodiment of the present application on the display device can be arbitrarily set according to a pixel size that can be provided by an array substrate and requirements on touch control precision. When there is a high requirement on the touch control precision, the density set is increased correspondingly. Of course, this will affect overall transmittance of the panel. As shown in FIG. 12, the pixel distribution of the display device provided by the embodiment of the present application includes 3×3 distribution of the pixel units of the touch display circuit provided by the embodiment of the present application, i.e., there is one touch display circuit provided by the embodiment of the present application in every three pixel units horizontally or longitudinally on the display device. As shown in FIG. 12, P1, P2, P3 and P4 are the pixel units comprising the touch display circuit provided by the embodiment of the present application.

The display device may be E-paper, a mobile phone, a tablet personal computer, a television, a monitor, a laptop, a digital photo frame, a navigator, and any other product or component having a display function.

The display device provided by the embodiment of the present application uses the touch display circuit, which comprises the photosensitive touch unit, the driving unit, the threshold compensating unit and the display unit, which efficiently integrates the photosensitive in cell touch technology into the AMOLED display, and meanwhile, the operating current flowing through the light-emitting unit is not affected by the threshold voltage of the corresponding driving unit, which well solves the problem of uneven display luminance caused by shift of the threshold voltage of the driving unit.

The foregoing embodiments merely are exemplary embodiments of the present application, and not intended to define the scope of the present application; modification or substitution which is easily thought by any person skilled in the art within the technical scope disclosed by the present application should fall into the protection scope of the present application. Therefore, the protection scope of the present application should be the protection scope of the claims.

The present application claims priority of Chinese Patent Application No. 201410371059.1 filed on Jul. 30, 2014, the disclosure of which is incorporated herein by reference in its entirety as part of the present application.

What is claimed is:

1. A touch display circuit, comprising a photosensitive touch unit, a driving unit, a threshold compensating unit and a display unit; wherein
   the photosensitive touch unit is connected with a first scanning signal terminal, a second scanning signal terminal, a signal detection line and a data line, and is used for, when the first scanning signal terminal inputs a first detection signal, generating a second detection signal according to light intensity of a touch position and a data signal of the data line under control of the second scanning signal terminal, and outputting the second detection signal through the signal detection line;

the threshold compensating unit is connected with a third scanning line signal terminal, a fourth scanning line signal terminal, the data line and a control terminal and an input terminal of the driving unit, and is used for outputting a control voltage to the control terminal of the driving unit, outputting an operating voltage to the input terminal of the driving unit, and compensating a threshold voltage of the driving unit in the control voltage under control of the third scanning line signal terminal, the fourth scanning line signal terminal and the data line;

the control terminal and the input terminal of the driving unit are connected with the threshold compensating unit, and are used for outputting a driving current to the display unit via an output terminal under control of the control voltage and the operating voltage;

the display unit is connected with a fifth scanning signal terminal and the output terminal of the driving unit, and is used for being driven to emit light by the driving current under control of the fifth scanning signal terminal.

2. The touch display circuit according to claim 1, wherein, the photosensitive touch unit includes: a first transistor, a second transistor, a third transistor and a first capacitor;

a gate of the first transistor is connected with the first scanning signal terminal, and a first electrode of the first transistor is connected with the data line;

a gate of the second transistor is connected with a first electrode of the second transistor, and the first electrode of the second transistor is connected with a second electrode of the first transistor;

a first electrode of the first capacitor is connected with the gate of the second transistor, and a second electrode of the first capacitor is connected with a second electrode of the second transistor;

a first electrode of the third transistor is connected with the second electrode of the second transistor, a gate of the third transistor is connected with the second scanning signal terminal, and a second electrode of the third transistor is connected with the signal detection line; and the second transistor is a photosensitive transistor.

3. The touch display circuit according to claim 2, wherein, the threshold compensating unit includes: a fourth transistor, a fifth transistor, a sixth transistor, a seventh transistor and a second capacitor;

a gate of the fourth transistor is connected with a fourth scanning signal terminal, a first electrode of the fourth transistor is connected with a first level terminal, and a second electrode of the fourth transistor is connected with a second electrode of the second capacitor;

a gate of the fifth transistor is connected with the fourth scanning signal terminal, a first electrode of the fifth transistor is connected with the first level terminal, and a second electrode of the fifth transistor is connected with the input terminal of the driving unit;

a gate of the sixth transistor is connected with the third scanning signal terminal, a first electrode of the sixth transistor is connected with a first electrode of the second capacitor, and a second electrode of the sixth transistor is connected with the input terminal of the driving unit;

a gate of the seventh transistor is connected with the third scanning signal terminal, a first electrode of the seventh transistor is connected with the data line, and a second electrode of the seventh transistor is connected with the second electrode of the second capacitor; and the first electrode of the second capacitor is connected with the control terminal of the driving unit.

4. The touch display circuit according to claim 3, wherein, the display unit includes: a ninth transistor and a light-emitting diode connected in series;

a gate of the ninth transistor is connected with the fifth scanning signal terminal, a first electrode of the ninth transistor is connected with the output terminal of the driving unit, a second electrode of the ninth transistor is connected with a first electrode of the light-emitting diode, and a second electrode of the light-emitting diode is connected with a second level terminal.

5. The touch display circuit according to claim 3, wherein, the display unit includes: a ninth transistor and a light-emitting diode connected in parallel;

a gate of the ninth transistor is connected with the fifth scanning signal terminal, a first electrode of the ninth transistor is connected with the output terminal of the driving unit, and a second electrode of the ninth transistor is connected with the second level terminal;

a first electrode of the light-emitting diode is connected with the output terminal of the driving unit, and a second electrode of the light-emitting diode is connected with the second level terminal.

6. The touch display circuit according to claim 5, wherein, the first scanning signal terminal, the third scanning signal terminal and the fifth scanning signal terminal are connected with a first scanning line; and the second scanning signal terminal and the fourth scanning signal terminal are connected with a second scanning line.

7. The touch display circuit according to claim 4, wherein, the first scanning signal terminal and the third scanning signal terminal are connected with a first scanning line;

the second scanning signal terminal and the fourth scanning signal terminal are connected with a second scanning line; and the fifth scanning signal terminal is connected with a third scanning line.

8. The touch display circuit according to claim 2, wherein, the threshold compensating unit is further connected with the output terminal of the driving unit and a sixth scanning signal terminal, and is used for outputting a control voltage to the control terminal of the driving unit, outputting an operating voltage to the input terminal of the driving unit, and compensating a threshold voltage of the driving unit in the control voltage under control of the third scanning line signal terminal, the fourth scanning line signal terminal, the sixth scanning signal terminal and the data line;

the threshold compensating unit includes: a fourth transistor, a fifth transistor, a sixth transistor, a seventh transistor and a second capacitor;

a gate of the fourth transistor is connected with the sixth scanning signal terminal, a first electrode of the fourth transistor is connected with a first level terminal, and a second electrode of the fourth transistor is connected with the input terminal of the driving unit;

a first electrode of the second capacitor is connected with the first level terminal, and a second electrode of the second capacitor is connected with the control terminal of the driving unit;

a gate of the fifth transistor is connected with the fourth scanning signal terminal, a first electrode of the fifth transistor is connected with the second electrode of the second capacitor, and a second electrode of the fifth transistor is connected with the input terminal of the driving unit;

a gate of the sixth transistor is connected with the third scanning signal terminal, a first electrode of the sixth transistor is connected with a third level terminal, and a second electrode of the sixth transistor is connected with the second electrode of the second capacitor;

a gate of the seventh transistor is connected with the fourth scanning signal terminal, a first electrode of the seventh transistor is connected with the data line, and a second electrode of the seventh transistor is connected with the output terminal of the driving unit.

9. The touch display circuit according to claim 8, wherein, the first scanning signal terminal and the third scanning signal terminal are connected with a first scanning line;

the second scanning signal terminal and the fourth scanning signal terminal are connected with a second scanning line; and the fifth scanning signal terminal and the sixth scanning signal terminal are connected with a third scanning line.

10. The touch display circuit according to claim 1, wherein, the photosensitive touch unit is further connected with a sixth scanning signal terminal;

the photosensitive touch unit includes a first transistor, a second transistor, a third transistor, a fourth transistor and a first capacitor;

a gate of the first transistor is connected with the first scanning signal terminal, and a first electrode of the first transistor is connected with the data line;

a gate of the second transistor is connected with a first electrode of the second transistor, and the first electrode of the second transistor is connected with a second electrode of the first transistor;

a first electrode of the first capacitor is connected with the gate of the second transistor, and a second electrode of the first capacitor is connected with a second electrode of the second transistor;

a first electrode of the third transistor is connected with the second electrode of the second transistor, a gate of the third transistor is connected with the second scanning signal terminal, and a second electrode of the third transistor is connected with the signal detection line; and a gate of the fourth transistor is connected with the sixth scanning signal terminal, a first electrode of the fourth transistor is connected with the second electrode of the first transistor, and a second electrode of the fourth transistor is connected with a third level terminal; and the second transistor is a photosensitive transistor.

11. The touch display circuit according to claim 10, wherein, the threshold compensating unit is further connected with the output terminal of the driving unit and a seventh scanning signal terminal, and is used for outputting a control voltage to the control terminal of the driving unit, outputting an operating voltage to the input terminal of the driving unit, and compensating a threshold voltage of the driving unit in the control voltage under control of the third scanning line signal terminal, the fourth scanning line signal terminal, the seventh scanning signal terminal and the data line;

the threshold compensating unit includes: a fifth transistor, a sixth transistor, a seventh transistor, an eighth transistor and a second capacitor;

a gate of the fifth transistor is connected with the fourth scanning signal terminal, a first electrode of the fifth transistor is connected with a first level terminal, and a second electrode of the fifth transistor is connected with the input terminal of the driving unit;

a gate of the sixth transistor is connected with the third scanning signal terminal, a first electrode of the sixth transistor is connected with the data line, and a second electrode of the sixth transistor is connected with the input terminal of the driving unit;

a gate of the seventh transistor is connected with the seventh scanning signal terminal, a first electrode of the seventh transistor is connected with the third level terminal, and a second electrode of the seventh transistor is connected with the control terminal of the driving unit;

a gate of the eighth transistor is connected with the third scanning signal terminal, a first electrode of the eighth transistor is connected with the output terminal of the driving unit, and a second electrode of the eighth transistor is connected with the control terminal of the driving unit;

a first electrode of the second capacitor is connected with the control terminal of the driving unit, and a second electrode of the second capacitor is connected with the third level terminal.

12. The touch display circuit according to claim 11, wherein, the first scanning signal terminal and the third scanning signal terminal are connected with a first scanning line;

the second scanning signal terminal, the fourth scanning signal terminal and the fifth scanning signal terminal are connected with a second scanning line; and the sixth scanning signal terminal and the seventh scanning signal terminal are connected with a third scanning line.

13. The touch display circuit according to claim 10, wherein, the threshold compensating unit includes: a fifth transistor, a sixth transistor, a first driving transistor and a second capacitor;

a gate of the fifth transistor is connected with the third scanning signal terminal, and a first electrode of the fifth transistor is connected with the data line;

a gate of the sixth transistor is connected with the fourth scanning signal terminal, a first electrode of the sixth transistor is connected with the control terminal of the driving unit, and a second electrode of the sixth transistor is connected with a third level terminal;

a control terminal of the first driving transistor is connected with the control terminal of the driving unit, an input terminal of the first driving transistor is connected with the second electrode of the fifth transistor, and an output terminal of the first driving transistor is connected with the control terminal of the driving unit;

a first electrode of the second capacitor is connected with the control terminal of the driving unit, and a second electrode of the second capacitor is connected with a first level terminal and the input terminal of the driving unit.

14. The touch display circuit according to claim 13, wherein, the first scanning signal terminal and the third scanning signal terminal are connected with a first scanning line;

the second scanning signal terminal and the fifth scanning signal terminal are connected with a second scanning line; and the fourth scanning signal terminal and the sixth scanning signal terminal are connected with a third scanning line.

15. The touch display circuit according to claim 8, wherein, the display unit includes: a ninth transistor and a light-emitting diode connected in series;

a gate of the ninth transistor is connected with the fifth scanning signal terminal, a first electrode of the ninth transistor is connected with the output terminal of the driving unit, a second electrode of the ninth transistor is connected with the first electrode of the light-emitting diode, and a second electrode of the light-emitting diode is connected with a second level terminal.

16. The touch display circuit according to claim 1, wherein, the driving unit is a thin film field effect transistor, the input terminal of the driving unit is a source of the thin film field effect transistor, the control terminal of the driving unit is a gate of the thin film field effect transistor, and the output terminal of the driving unit is a drain of the thin film field effect transistor.

17. A display device, comprising the touch display circuit according to claim 1.

18. The touch display circuit according to claim 9, wherein, the display unit includes: a ninth transistor and a light-emitting diode connected in series;

a gate of the ninth transistor is connected with the fifth scanning signal terminal, a first electrode of the ninth transistor connected with the output terminal of the driving unit, a second electrode of the ninth transistor is connected with the first electrode of the light-emitting diode, and a second electrode of the light-emitting diode is connected with a second level terminal.

19. The touch display circuit according to claim 10, wherein, the display unit includes: a ninth transistor and a light-emitting diode connected in series;

a gate of the ninth transistor is connected with the fifth scanning signal terminal, a first electrode of the ninth transistor is connected with the output terminal of the driving unit, a second electrode of the ninth transistor is connected with the first electrode of the light-emitting diode, and a second electrode of the light-emitting diode is connected with a second level terminal.

20. The touch display circuit according to claim 13, wherein, the display unit includes: a ninth transistor and a light-emitting diode connected in series;

a gate of the ninth transistor is connected with the fifth scanning signal terminal, a first electrode of the ninth transistor is connected with the output terminal of the driving unit, a second electrode of the ninth transistor is connected with the first electrode of the light-emitting diode, and a second electrode of the light-emitting diode is connected with a second level terminal.

* * * * *